United States Patent
Okcay et al.

(10) Patent No.: US 7,880,883 B2
(45) Date of Patent: Feb. 1, 2011

(54) FLUID FLOW COMPUTATION, VISUALIZATION, AND ANALYSIS

(75) Inventors: Murat Okcay, Rochester, MN (US); Bilgehan Uygar Oztekin, Mountain View, CA (US)

(73) Assignee: Interactive Flow Studies Corporation, Waterloo, IA (US)

( * ) Notice: Subject to any disclaimer, the term of this patent is extended or adjusted under 35 U.S.C. 154(b) by 285 days.

(21) Appl. No.: 12/130,798

(22) Filed: May 30, 2008

(65) Prior Publication Data

US 2009/0234595 A1 Sep. 17, 2009

Related U.S. Application Data

(63) Continuation-in-part of application No. 11/974,260, filed on Oct. 12, 2007, now Pat. No. 7,663,754.

(51) Int. Cl.
*G01N 21/00* (2006.01)
(52) U.S. Cl. ............... 356/432; 356/342; 356/444; 702/50; 73/148
(58) Field of Classification Search ......... 356/432–444, 356/336, 338, 244–246; 73/148; 702/50
See application file for complete search history.

(56) References Cited

U.S. PATENT DOCUMENTS

| | | | |
|---|---|---|---|
| 6,013,921 A | 1/2000 | Moller et al. | 250/573 |
| 6,549,274 B1 | 4/2003 | Arndt et al. | 356/28 |
| 6,700,652 B2 | 3/2004 | Chao et al. | 356/28 |
| 6,940,888 B2 | 9/2005 | Liu | 372/97 |
| 7,389,188 B2 * | 6/2008 | Toda et al. | 702/50 |
| 7,471,394 B2 * | 12/2008 | Padmanabhan et al. | 356/365 |
| 7,641,856 B2 * | 1/2010 | Padmanabhan et al. | 422/73 |
| 2005/0283323 A1 * | 12/2005 | Anderson | 702/50 |

* cited by examiner

*Primary Examiner*—Tarifur R. Chowdhury
*Assistant Examiner*—Isiaka O Akanbi
(74) *Attorney, Agent, or Firm*—Clise, Billion & Cyr, P.A.; Tim Clise

(57) ABSTRACT

This document discusses, among other things, systems, devices and methods for fluid flow analysis for example, in an education environment. The light source, for example, a laser, is housed to illuminate particles in a fluid while minimizing exposure to the user. A control unit is provided that is remote from the fluid flow device. The fluid flow device further includes a removable fluid obstacle such that different fluid flow effects can be obtained. A computational unit is provided to perform computational fluid flow dynamics analysis on fluid flow models. The computed data can then be compared to the test data from the fluid flow analysis device.

20 Claims, 19 Drawing Sheets

FLUID FLOW COMPUTATION, VISUALIZATION, AND ANALYSIS

RELATED APPLICATION

The present application is a Continuation-In-Part of U.S. patent application Ser. No. 11/974,260, filed Oct. 12, 2007 now U.S. Pat. No. 7,663,754, and titled FLUID FLOW VISUALIZATION AND ANALYSIS, and having the same inventors as the present patent application. U.S. patent application Ser. No. 11/974,260 is hereby incorporated by reference in its entirety for any purpose.

GOVERNMENT SUPPORT

This invention was made with government support from the National Science Foundation (NSF) under NSF Grant No. IIP-0740550. The United States Government has certain rights in this invention.

TECHNICAL FIELD

This document pertains generally to fluid flow analysis, and more particularly, but not by way of limitation, to device, methods and systems for demonstrating and teaching of fluid flow phenomena.

BACKGROUND

Fluid Dynamics is the study of fluid flow and can be difficult to conceptualize without laboratory experiments. Particle Image Velocimetry (PIV) is used to visualize and analyze fluid flow but particle image velocimetry systems that are used for research are expensive and utilize Class IV Nd:YAG lasers that may be dangerous, if appropriate safety measures are not followed, and cost prohibitive for educational purposes. Examples of particle image velocimetry systems are described in U.S. Pat. Nos. 6,013,921; 6,549,274; 6,700,652; and 6,940,888.

OVERVIEW

A fluid flow analysis system can include a computational unit to perform computational fluid dynamics, a particle image velocimetry device to generate physical test data, and a control unit in communication with the computational unit to receive computational fluid dynamics data and in communication with the particle image velocity device to receive the physical test data. In an embodiment, the computational unit receives boundary conditions related to a fluid flow path in the particle image velocimetry device. In an embodiment, the computational unit downloads boundary conditions from a server. In an embodiment, the computational unit downloads boundary conditions from a user. In an embodiment, the computational unit downloads boundary conditions that relate to walls of the fluid flow path. In an embodiment, the computational unit generates mesh data for a given flow model to be modeled in the particle image velocimetry device. In an embodiment, the computational unit computes initial flow conditions based on prior data from the particle image velocimetry device. In an embodiment, the computational unit is part of the control unit.

The particle image velocimetry device can include a housing; a fluid flow path operably connected to the housing; a pump connected to the housing and to move fluid in the fluid flow path; a removable obstacle assembly that includes a portion of the fluid flow path and an obstacle positioned in the portion of the fluid flow path; a light source to illuminate fluid adjacent the obstacle in the fluid flow path; an imager to image fluid adjacent the obstacle in the fluid flow path; a further control unit in communication with the imager, or combinations thereof. In an embodiment, the further control unit is to receive commands including at least one of the group consisting of brightness, exposure, frame rate, gain, and video size. In an embodiment, the imager is a digital, charge coupled device, wherein the housing includes a blood flow simulation device operably connected to the fluid flow path. In an embodiment, the housing includes a pressure measurement device to measure fluid pressure in the fluid flow path. In an embodiment, the fluid flow path travels adjacent the light source to cool the light source. In an embodiment, the pump runs continuously while the system is on and provides fluid flow to cool the light source. In an embodiment, the obstacle is removable from the body such that a further obstacle may be positioned in the body such that a different obstacle may be studied in the particle image velocimetry device. In an embodiment, the light source includes a laser that emits a low power, green light. In an embodiment, the housing includes a slot to receive the obstacle assembly, wherein the slot includes an open end that is not aligned with the light source such that no direct light escapes the housing with the obstacle assembly removed, and wherein the light source includes a switch that turns off the light source with the obstacle assembly removed and that turns on the light source with the obstacle assembly in the slot.

A method can include providing computational fluid flow dynamics data of a fluid flow model; performing particle image velocimetry on the fluid flow model; and comparing particle image velocimetry data to the computational fluid flow dynamics data. In an embodiment, the method further includes a user uploading at least one of boundary conditions or initial conditions for performing computational fluid flow dynamics analysis. In an embodiment, the method further includes downloading stored boundary conditions and initial conditions for computational fluid flow dynamics analysis.

In an example, a control system for a particle image velocimetry device is provided that includes a input/output to communicate with a fluid flow device; a data storage to store fluid flow data; an imager control module to remotely control operation of an imager in the fluid flow device; and a display module to output data acquired from the fluid flow device. In an example, the imager control device is to control at least one of brightness, exposure, frame rate, gain, and video size. In an example, the input/output includes a key that allows operation of the fluid flow device that can not operate absent the key. In an example, the input/output is to allow a plurality of users to access a single fluid flow device. In an example, an analysis module is provided to analyze particle image velocimetry data. In an example, methods of operating the present devices and systems are described. A particle image velocimetry method, includes flowing particle entrained fluid in a fluid flow path past an obstacle; illuminating the fluid at the obstacle; imaging fluid flow at the obstacle; optionally replacing the obstacle with a further obstacle while automatically turning off the illumination. In an example, replacing the obstacle includes continuing to flow fluid in the fluid flow path to cool the light source while replacing the obstacle. In an example, imaging fluid flow includes remotely controlling imaging and sending image data to a remote location. In an example, imaging includes remote display of the image data.

This overview is intended to provide an overview of the subject matter of the present patent application. Each of the above examples and the remainder of the present disclosure can be combined with any other example or disclosure herein. It is not intended to provide an exclusive or exhaustive explanation of the invention. The detailed description is included to provide further information about the subject matter of the present patent application.

BRIEF DESCRIPTION OF THE DRAWINGS

In the drawings, which are not necessarily drawn to scale, like numerals may describe substantially similar components in different views. Like numerals having different letter suffixes may represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls. Similar elements in different views may be indicated using the same reference numbers from different views to aid in the understanding of the present disclosure.

Figure 1:
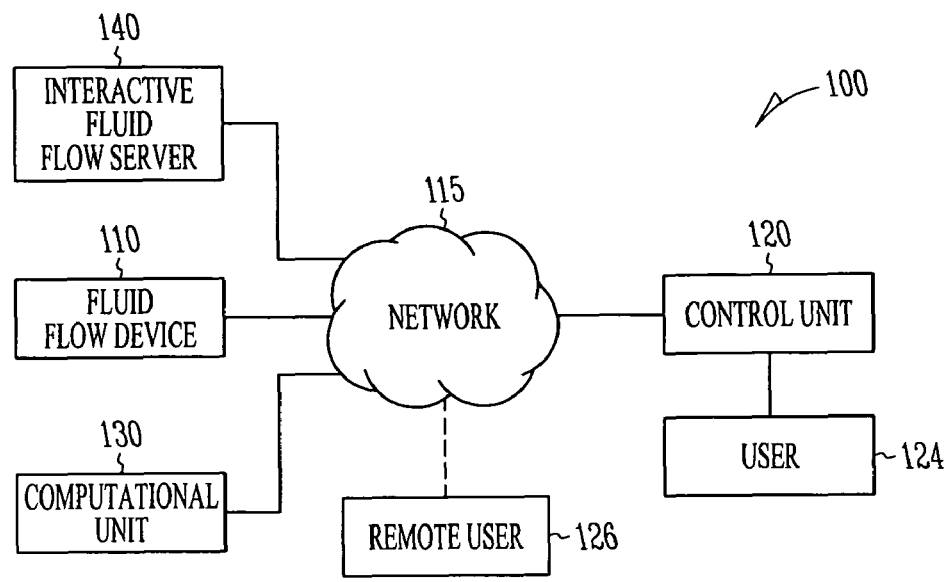
FIG. 1 is a schematic view of fluid flow analysis system.

FIG. 1 shows a fluid flow analysis, e.g., a particle image velocimetry, system 100 that includes a fluid flow device 110, such as a particle image velocimetry device, connected to a network 115. The particle image velocimetry device 100 is adapted to take images of a fluid as it passes an imaging field. Based on images, the flow speed and direction of the fluid is determined at different parts of the field. In one use, the system fluid flow analysis 100 is used in an educational setting to teach students the principals of fluid flow. The present system 100 is particularly suited for such a setting as research level particle image velocimetry devices are too expensive, difficult to use, or pose dangers to the students that may be unfamiliar with a research level system. The network 115 connects the device 110 to a control unit 120. The network 115 can be a global computer network, such as the internet. In a further example, the network 115 is an intranet or other local area network. Control unit 120 includes rule sets to control operation of the device 110. A user 124 may directly interface with the control unit 120, for example with an input device such as a keyboard, mouse, other pointing device, etc. A remote user or users 124 may connect to the control unit 120 through the network 115. The control unit 120 can include a remote server and data storage. The control unit 120 can further include algorithms to analyze data from the device 110. Control unit 120 can further include a display to display the data in a raw form or an analyzed form. Control unit 120 can further form an automatically configured wireless network to which users within a certain distance (e.g. inside a building/lab) may connect, e.g., via wi-fi or Bluetooth enabled devices such as notebook computers and personal data assistants. In an example, the control unit 120 is a personal computer that includes a processor, memory and a web browser to enable communication with the fluid flow device 110.

System 100 includes a computational unit 130 to provide computational fluid dynamics (CFD) ability to the present system 100. Computational unit 130 can be a general purpose computer that includes an operating system and specific CFD software run by the operating system. Unit 130 may further include additional hardware that enhances CFD, such as arithmetic logic units, parallel processor, etc. Unit 130 can further include various computer networking devices that allow it to communicate via the network 115 to the control unit 120 and, if needed, to remote users 126. In a further embodiment, the computational unit is a sub-system of control unit 120. The computational unit 130 is to use numerical methods to simulate and predict various flow properties under model and initial conditions. Such models and conditions can include laminar flow and two-dimension modeling. Further discussion of CFD and operation of computation unit 130 is found below.

System 100 can further include an interactive fluid flow server 140, which can provide control software for the fluid flow device 110 to the control unit 120, provide communication links between the control unit 120, remote users 126, if any, and the computational unit 130. Server 140 can also provide data files for computational unit 130.

In operation, the fluid flow device 110 takes images of fluid flow, e.g., with entrained particles, based on control signals from the control unit 120. These images are sent to the control unit 120 via a direct link, e.g., a firewire cable, or via network 115. The control unit 120 analyzes the image data to provide a fluid flow data. This data may be presented as a visual representation or as raw data. Raw data can include numerical data. The visual representation can play an important role in teaching fluid dynamics to students. The user 124 or 126 may change certain operational parameters of the fluid flow device 110 to improve the capture of data or alter the flow being analyzed.

Figure 2:
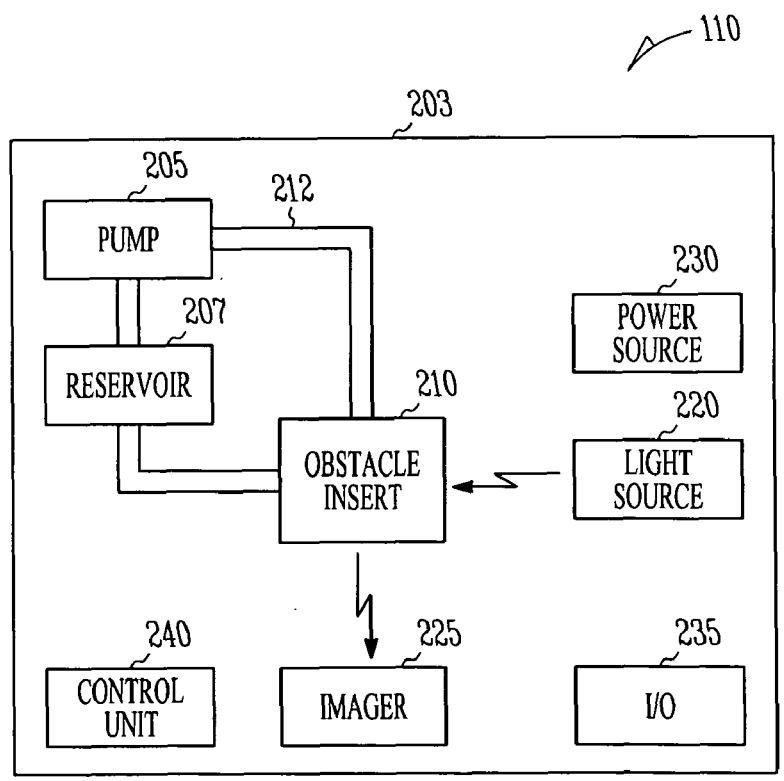
FIG. 2 is a view of a fluid flow analysis device.

FIG. 2 shows a schematic view of a fluid flow device 110 according to an embodiment. The device 110 includes a housing 203 to support a pump 205, a fluid reservoir 207, and an obstacle insert 210. The housing encloses all of these elements in an embodiment of the present invention. A fluid flow path 212 fluidly connects the pump 205, reservoir 207, and obstacle insert assembly 210. The fluid flow path 212 is mostly enclosed within the housing 203. In an embodiment a relatively short portion of the fluid flow path can extend outside the housing 203. In an embodiment, the fluid in the path is water. A light source 220 is positioned in the housing and illuminates the fluid flow path 212 at the obstacle insert assembly 210 such that the fluid and any entrained particles are visible. An imager 225 is positioned in the housing and images the fluid at the obstacle insert assembly. In an embodiment, the imager 225 takes pictures of the fluid covering the areas before, at, and after the obstacle insert assembly. The obstacle insert assembly 210 is adapted to change the obstacle in the fluid flow path at the field where the light source 220 illuminates the fluid and the imager 225 can image the illuminated fluid at this field. A power source 230 provides electrical power to the pump 205, light source 220, and the imager 225. The power source 230 can include a battery or circuitry to receive standard utility power and output a DC power signal. In an embodiment, the power source 230 outputs different power signals to the pump, light source, and imager. For example, the pump 205 may require a power signal of about 12 volts and 2 amps (max.). The light source may require a power signal of 3 volts and 0.3 amp (max.). An input/output ("I/O") 235 is connected to housing 203. The I/O 235 is serial connection, modem, firewire, i.e., IEEE 1394, wireless, IEEE 802.016 connection, or other such connection to a further electronic device such as network 115 or control unit 120 as shown in FIG. 1. The I/O 235 can input control signals to at least one of the light source 220, imager 225, and pump 205. The I/O 235 can also output the image data from the imager to the control unit, e.g., control unit 120 as shown in FIG. 1. The I/O 235 can further include a key and keyhole, i.e., a mechanical key system, or be adapted to receive an electronic key to enable or disable the fluid flow device 110.

In an option, a control unit 240 is positioned in the housing 203. This control unit 240 can be in communication with at least the imager and, if desired, with the pump 205 and light source 220, to set default operational parameters of at least one of these devices. The control unit 240 may further include memory to store data from the imager 225. The control unit 240 can further control operation of the input/output 235.

Figure 3:
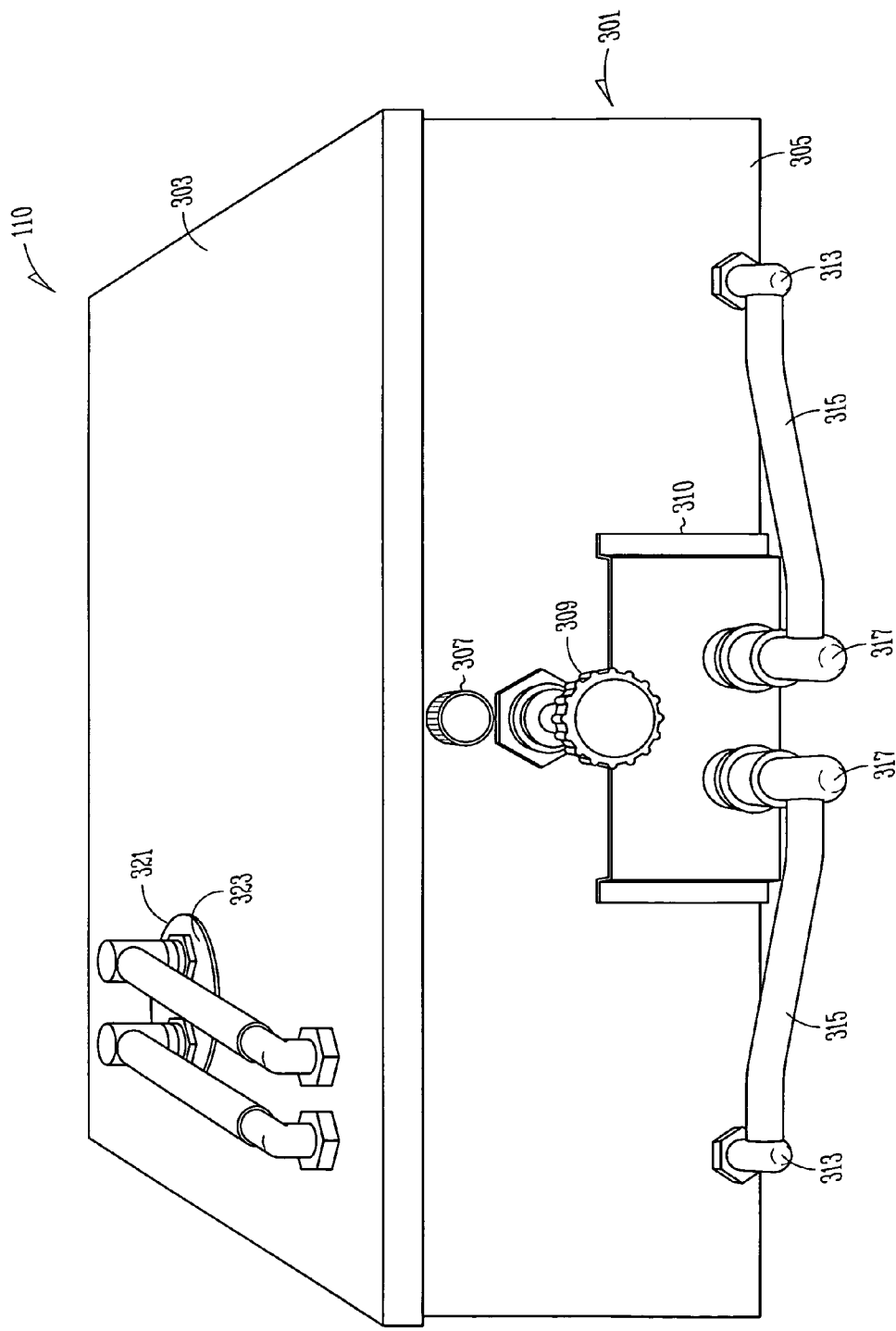
FIG. 3 is a view of a fluid flow analysis device.

FIG. 3 shows an external view of an embodiment of the fluid flow analysis device 110. Device 110 includes a box-like housing 301 with a connected lid 303 to create a closed internal space to hold the operating parts therein. The housing 301 is formed of a rigid, opaque material, such as metal or plastic. The front face 305 of housing 301 includes an indicator light 307 to show whether the device 110 is on or off, i.e., powered or unpowered. A fluid flow control knob 309 extends from the front face 305. This knob 309 operates a fluid flow variable valve, which is fluidly connected to a fluid flow path, to increase and decrease the speed of fluid flow in the fluid flow path within the device. In a further embodiment, an electro-mechanical actuator, not shown, is provided with the housing to control fluid flow in place of the manual fluid flow valve. Such an actuator would be controlled by control signals from the control unit to control the fluid flow rate. The flow model assembly 310 is received in a slot in the front face 305 of housing 301. The slot includes an open end in the housing. The open end is not aligned with the light source such that no direct light escapes the housing with the obstacle assembly removed. Assembly 310 can be releasably held in the fully inserted position by ball and detent mechanism or by magnets. The fluid flow path further extends out of the front face 305 via elbow connectors 313, transparent tubing 315 and releasable connectors 317. The releasable connectors 317 are fluid tight when removed from mating connectors of the flow model assembly 310. These releasable connectors 317 allow for the removal of the flow model assembly 310 with the device 101 powered in the on state. The connectors 317 are released and the flow model assembly 310 is removed from the housing 301 such the obstacle insert in the flow model assembly can be changed.

The lid 303 includes apertures such that the fluid flow path extends outside the lid. A large aperture 321 is provided above a fluid reservoir that is within the housing. A reservoir cover 323 is visible through the aperture 321 and can be removed without removing the lid 303 such that additional fluid can be added to the reservoir without stopping the device 101. Lid 303 is fixed to the open top of the housing 301 such that access to the parts therein is not easily attained. However, access to the flow model assembly and the fluid is easily attained. This allows a relatively inexperienced user to use the device with a reduced chance the user will damage the device or injure themselves.

Figure 4:
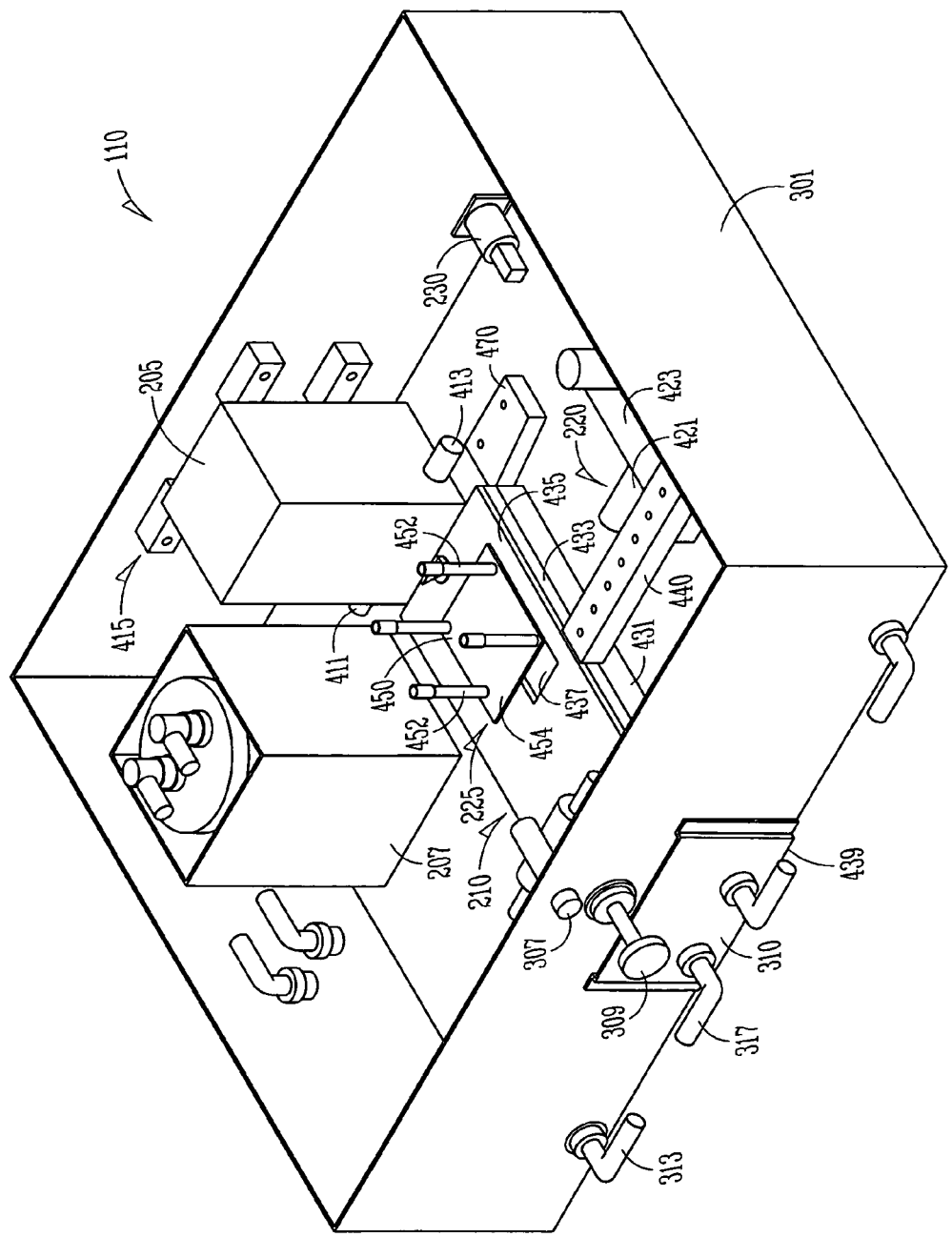
FIG. 4 is a view of a fluid flow analysis device.

FIG. 4 shows a view of fluid flow analysis device 110, which includes pump 205, reservoir 207, obstacle insert 210, for example, fluid flow model 310, light source 220, imager 225, and power source 230. An input/output is not shown. Moreover, fixed portions of the fluid flow path, including the elbows 313 and connectors 317, are shown. The fluid flow path will be described in greater detail elsewhere in this document. The pump 205 includes an inlet 411 and an outlet 413. Inlet 411 is in fluid communication with the fluid reservoir 207. Outlet 413 exits pressurized fluid from pump 205. That is the pump creates a pressure head in the fluid at the outlet, which causes the fluid to flow in the path. A damping system 415 connects the pump 205 to the box 301. The damping system 415 includes at least one and, in an embodiment, a plurality of structures to reduce the vibration and noise caused by the pump. Such vibration may alter the results of the fluid flow analysis. The vibration reduction structures can include a polymer spacer block intermediate a wall of the box and the pump. A plurality of rigid, vibration damping washers are staked intermediate a plurality of soft, polymer O-rings to further dampen vibrations from the pump to the housing wall of the box. A plastic bolt and nut are used to fix the pump to the sidewall of the housing. In an embodiment, O-rings are positioned on the interior and exterior of the sidewall. Washers are positioned outwardly of the O-rings. A damping jacket may wrap around the outer surface of the pump to further dampen vibrations and reduce noise. A pump will have a certain level of vibration due to its pumping action. The damping system will reduce the level of vibration so as to not interfere with the fluid flow analysis. The damping system will also reduce pump noise.

As vibration may adversely effect the operation of the particle image velocimetry device, its housing 301 can include vibration damping feet. The feet can be rubberized feet in an example. The feet may also assist in noise reduction.

The fluid flow obstacle insert assembly 210 includes a base 431 to support an intermediate member 433 that defines a portion of the fluid flow path, and a cover 435. The intermediate member 433 is transparent to the light from the light source such that the light illuminates the fluid flow path in the intermediate member. The intermediate member 435 includes two fluid ports at a front face. The ports extend outwardly of a front face of the housing when the insert assembly 210 is positioned in the housing. A face plate 439 is fixed to the front of the stack of the base 431, intermediate member 433, and cover 435. The face plate covers the aperture in the front wall of the housing to assist in preventing light from escaping the housing. In an embodiment, the ports fix the face plate to the intermediate member. The cover 435 is removably secured to the top of the intermediate member. Removal of the cover 435 gives access to the obstacle insert. The cover 435 fluidly seals the fluid flow path in the intermediate member 433. An aperture 437 that acts as a viewing window for the portion of the fluid flow path in the intermediate member is positioned in the cover 435. In an embodiment, the aperture 437 is aligned with the portion of the fluid flow path that includes the obstacle insert.

The light source 220 is fixed adjacent one sidewall of housing 301. The light source 220 includes an emitter 421 to output light toward the fluid flow insert 310. The emitter 421 can be a light emitting diode in an example. The emitter can be a laser in an embodiment. In an embodiment, the light emitted by the light source is a green light. In an embodiment, the light emitted is a red light. The laser can be a category II, line laser that emits light at about 532 nm. While illustrated as a single light source, it will be recognized that a further light source can be mounted in the housing. The only requirement of the light source is that it illuminate particles in the fluid and be visible to the imager. In an embodiment, the light source emits green light or red light or a combination thereof. In an embodiment, the further light source could be mounted orthogonal to the light source 220. This will reduce edge effects at the flow model insert. The emitter 421 is mounted to a block 423. In an embodiment, thermal paste is applied at the interface between the emitter and the mounting block. The mounting block 423 is fixed to the housing and includes a portion of the fluid flow path through the block or mounted to the block. The mounting block can include an elongate support that is fixed to a main body of the block via a damper, such as an o-ring, to dampen effects of shock during movement of the fluid flow device to thus protect the light source from damage. As a result, the fluid flow will cool the block 423, which in turn will cool the emitter 421 to assist in operation of the emitter and prolong its life.

An electrical junction 440 is fixed to the housing 301. The electrical junction 440 electrically connects the electrical components of the device 110 together. The junction 440 is connected to power source 230 and distributes power to at least the pump 205 and light source 220. The electrical junction may power the imager 225 as well. In another example, the imager is powered through its communication connection, for example, through a universal serial bus (USB) or firewire connection. The junction 440 may further act as a communication junction between the imager and a remote terminal, such as the control unit 120.

The imager 225 includes a mount 450 and the imager device (not shown in FIG. 4). The mount 450 includes a plurality of support posts 452 that are fixed to the housing lid. In an embodiment, the posts are cantilevered from the housing lid. These support posts extend inwardly into the interior of the housing aligned with the aperture 437 of the obstacle insert assembly 210. A support platform or board, such as a printed circuit board (PCB), 454 is fixed to the ends of the support posts 452. Platform 454 can act as support for an imaging chip. An imaging device, such as a charge coupled device, is fixed to the bottom of the platform 454. The lens of the imaging device is aligned and closely adjacent the aperture 437 such that the imaging device can receive reflected light from the fluid flow path at the obstacle insert.

The imaging device is a high resolution, black and white camera in an embodiment. In a further example, the imaging device is a color camera. The camera can be a digital camera. The camera can include charge coupled devices. The imaging device may further provide raster scanning. The color camera may be used to study a fluid mixing of fluids that have different colors. For example, a first unit of water colored with a first dye and a second unit of water colored with a second dye can be imaged by the color imager at the imaging area. In a further example, the imager can image two different fluids that may have different flow properties and different colors. The imager may be adapted to sense and output pseudo-color image data that can be enhanced or manipulated in the control unit or locally with the device 110 to produce a color presentation of the fluid flow.

A switch 470 is positioned at the rearward end of the flow model assembly 310. The switch 470 is in an "on" position with the flow model assembly 310 fully inserted into the slot in the housing 301. The switch 470 in the "on" position allows power to the light source 220 and full power to the pump 205. When the flow model assembly 310 is slid outwardly of the housing, then the switch 470 moves to its default, "off" position. The switch 470 in the "off" position turns off the power to the light source. The switch in the "off" position turns off the full power connection and allows for a reduced power to the pump. The pump will continue to move fluid through the fluid flow path in this reduced power state but at a reduced pressure or reduced volume. In one embodiment, the pump will continue to move fluid to cool the light source even with the light source off.

Figure 5:
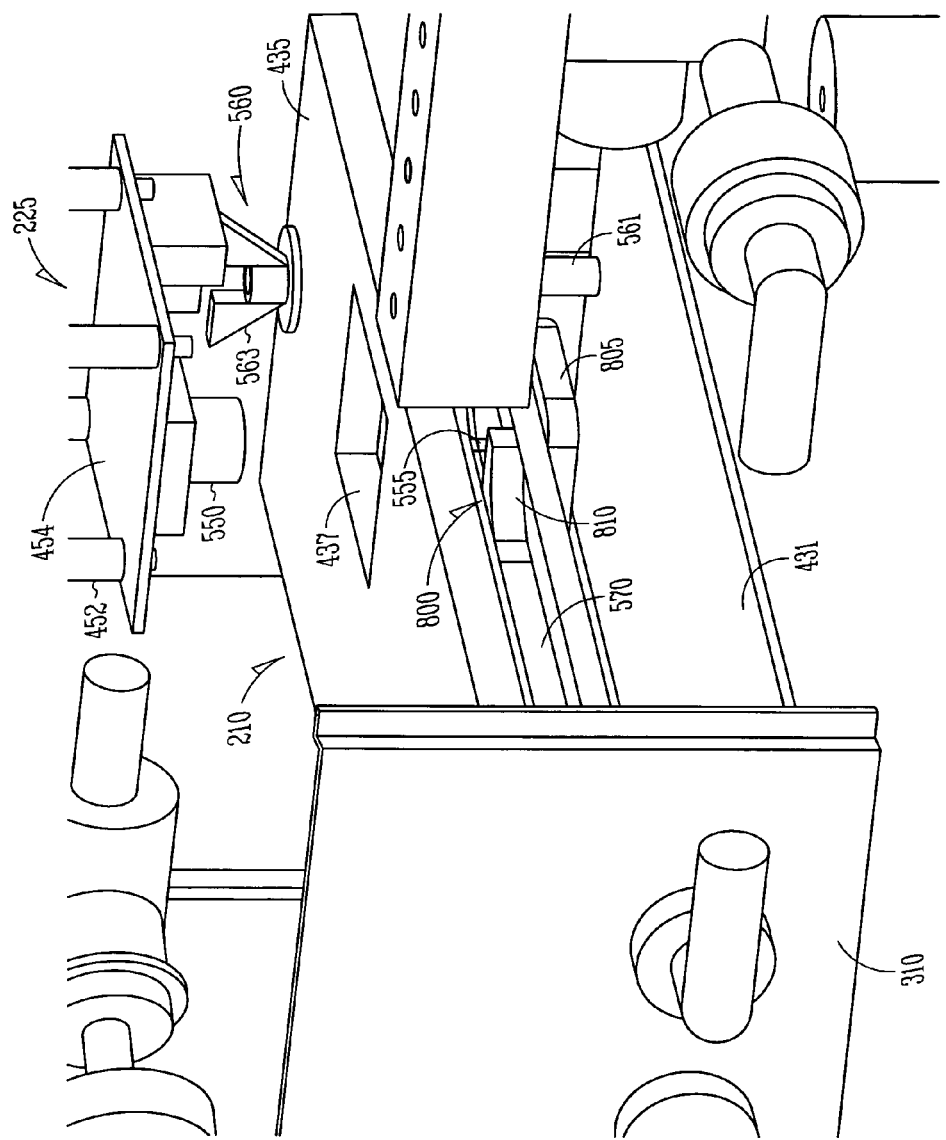
FIG. 5 is an enlarged, partial view of a fluid flow analysis device.

FIG. 5 shows an enlarged perspective, partial view of the fluid flow device 110. In this view, the imager 225 is shown with the lower part of the support posts 452 and the support platform 454. On the bottom side of the platform 454 is the imaging device 550, which includes a lens system focused on a portion of the fluid flow path 555 that is directly below the aperture 437 and in which is positioned a fluid flow obstacle 800. Details of the fluid flow obstacle 800 will be described in greater detail with regard to FIGS. 8A-8E. A connector unit 560 includes a bolt 561 extending through the base 431, intermediate member 433, and cover 437 and a fastener, such as a wing nut, 563 to removable hold the base 431, intermediate member 433, and cover 437 together. The base 431 and intermediate member 433 include a translucent portion and may be supported by a rigid backing, for example, a metal plate. The rigid backing ensures that the seal, e.g., o-ring or gasket, that seals the fluid flow path in the obstacle insert assembly 210 has an even, fluid-tight seal. The obstacle insert 800 sits in a recess in the intermediate member 433 such that the base portion 805 is not in the fluid flow path 570 and the obstacle 810 is in the fluid flow path. The recess in the intermediate member 433 has a depth essentially equal to the height of the base of the obstacle insert 800. The flow model bolt 561 and slot on the bottom of the housing 301 act as a guide to the flow model assembly 310. The bolt head is slightly larger than the slot width which allows the flow model assembly 310 to glide into the slot but prevent it from lifting up, which securely locates the flow model assembly 310 in the slot.

Figure 6:
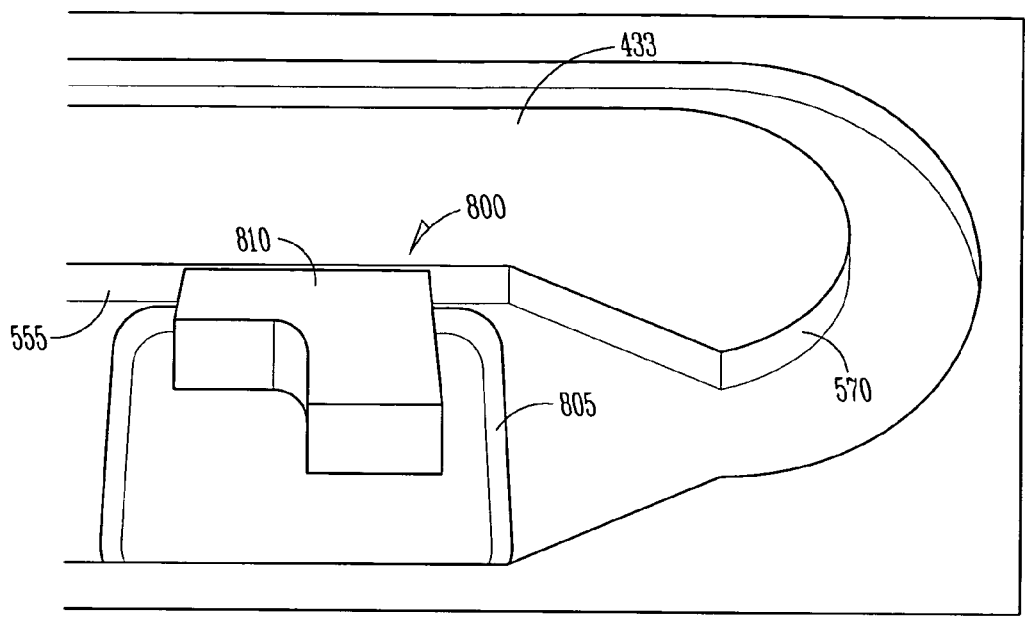
FIG. 6 is a partial view of a flow model assembly.

FIG. 6 shows an enlarged, partial view of the obstacle insert 210 with the cover 435 removed from the intermediate member 433 to show the fluid flow path 570 and obstacle insert 800 therein. The bottom surface of the fluid flow path is essentially co-planar including the top surface of the obstacle insert base 805. The smooth-walled, gradually turned fluid flow path in the obstacle insert 210 allows the fluid flow to develop gradually and to be relatively uniform before the obstacle 800 is encountered. The fluid flow in one of the ports (not shown) and travels past the obstacle insert 800, which creates a fluid flow pattern based on the type and shape of obstacle 810. The imager 225 takes an image of the fluid at the obstacle 810 for purposes of education and study of fluid flow dynamics in an embodiment.

The housing, insert, imager position, and flow path are all selected to minimize the effect of gravity on the particles in the fluid flow path. This corrects for one source of error in the study of fluid flow dynamics when using system 100. For example and with reference to FIGS. 4-6 the gravitational effects will be in the z-axis. The imager is taking images of the fluid flow with the path in the x-y plane, thus the gravitational effect is minimized. The fluid flow can be analyzed using particle image velocimetry techniques. The fluid is seeded with particles. The particles are selected to have minimum impact on fluid flow and maximize the contrast with the background and fluid. Ideally the particles will have essentially a neutral buoyancy relative to the fluid in the flow path.

Figure 7:
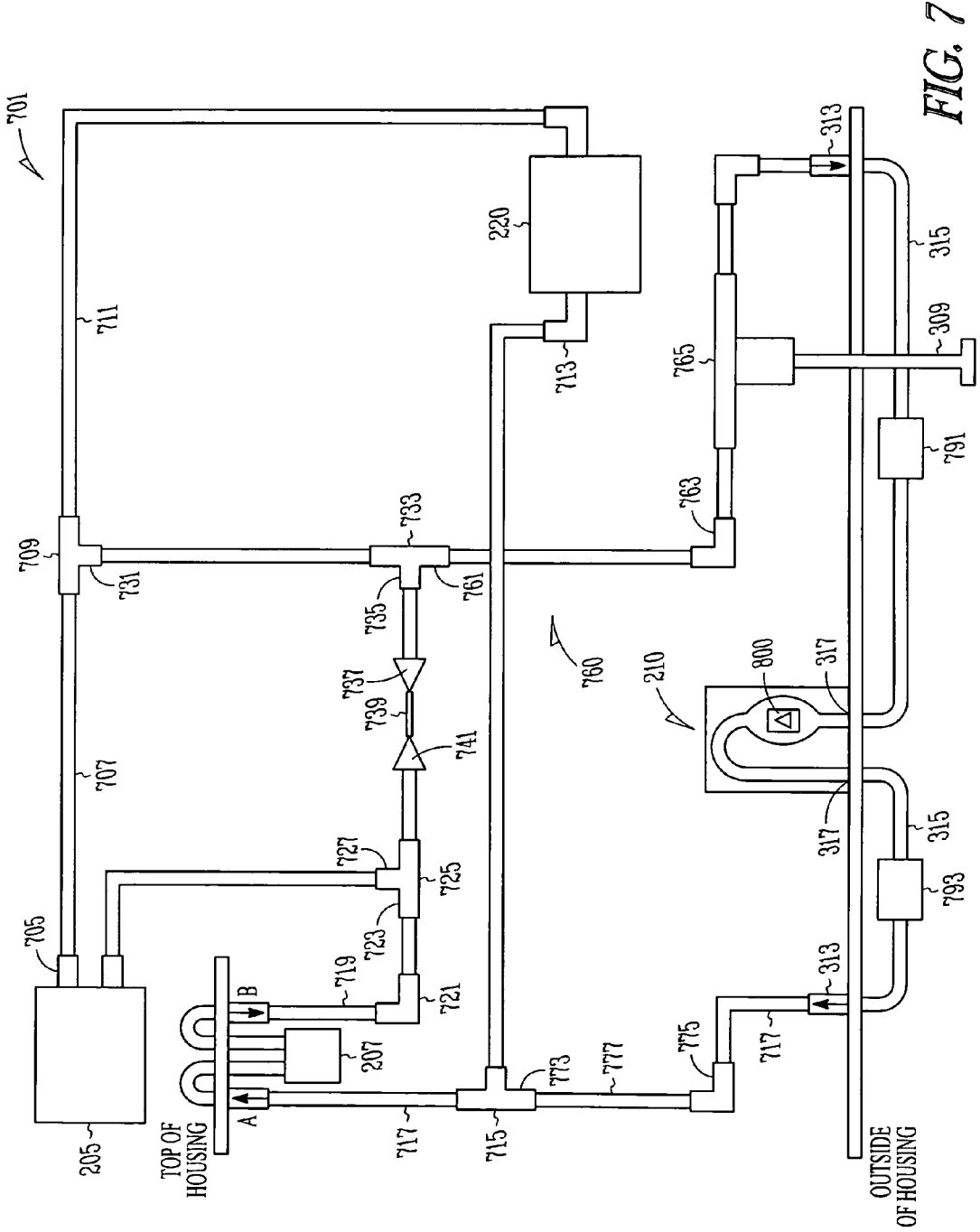
FIG. 7 is a schematic view of a fluid flow path according to an embodiment.
Figure 8A:
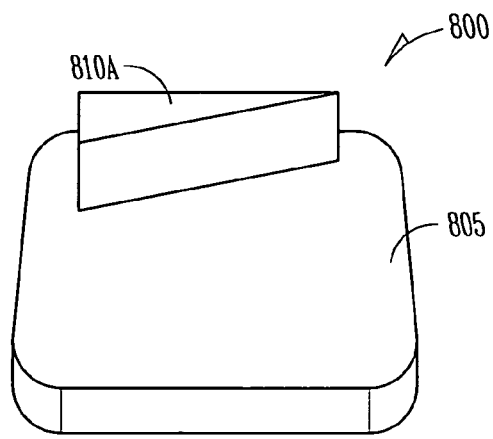
FIG. 8A is a view of a flow obstacle insert according to an embodiment.
Figure 8B:
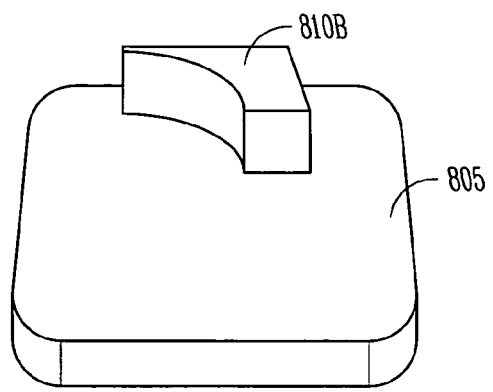
FIG. 8B is a view of a flow obstacle insert according to an embodiment.
Figure 8C:
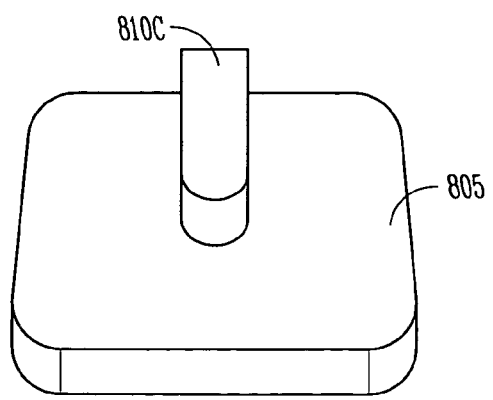
FIG. 8C is a view of a flow obstacle insert according to an embodiment.
Figure 8D:
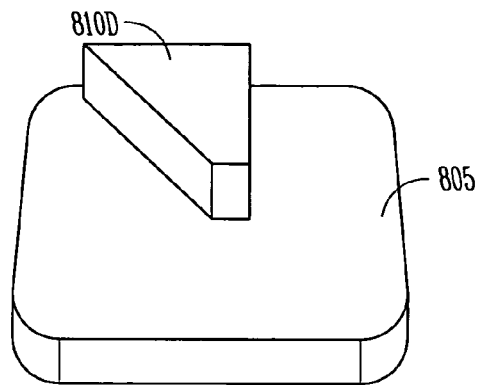
FIG. 8D is a view of a flow obstacle insert according to an embodiment.
Figure 8E:
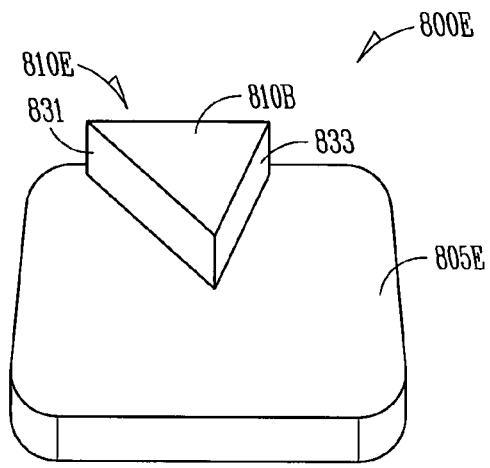
FIG. 8E is a view of a flow obstacle insert according to an embodiment.

FIG. 7 shows a schematic view of the fluid flow path 701 within the device 110. Path 701 includes a plurality of tubing sections, at least some of which is transparent such that some indirect illumination of the fluid is visible, for example, outside the housing to indicate to a user that the light source is working. This also allows visual inspection of potential bubbles in the system and helps in removing them via the syringe. A plurality of fluid connectors join the tubing sections. The connectors may be opaque. While not drawn to scale, the tubing lengths as shown represent lengths relative to other lengths of tubing. Beginning at the pump 205, an outlet 705 connects to tubing 707 that inputs into a tee-connector 709. One leg 711 of the tee 709 connects through tubing 711 to the light source 220. The fluid flowing in this path will cool the light source 220. An outlet 713 of light source 220 connects to tee-connector 715. A leg of t-connector 715 connects to tubing 717 that outlets outside a top of the housing and enters reservoir 207. Reservoir 207 is in fluid communication with a further port that connects to tubing 719 that connects to an elbow 721. A leg 723 of tee-connector 725 is fluidly connected to the elbow 721. A leg 727 of tee-connector 725 connects to the pump 205. The preceding represents a cooling fluid flow path. A feed-back path is also provided. The feed-back path includes a second leg 731 of tee connector 709 that fluidly connects with tee-connector 733. A leg 735 of tee-connector 733 fluidly connects with a flow reducer 737 that connects with a reduced diameter tube 739. At the other end of the tube 739 is a reducer 741 that fluidly connects with a leg 743 of tee-connector 725 to complete the fluid circuit. The reduced diameter tube 739 and reducers 737, 741 restrict the volume of fluid flow through the feed-back path. If the obstacle assembly is removed, then the fluid can still flow through the feed-back path with the pump at a reduced power setting.

Faster flow allows fluid streamline visualization, which is very important in understanding fluid flow phenomena. Slow flow allows particle image velocimetry analysis to be performed allowing the calculation of velocity and direction of the fluid flow. Once fluid velocity is calculated other flow parameters such as voracity, shear stress, shear strain can be calculated. Such visualization and calculation can be performed in the control unit 120 or in the remote user locations 126.

The fluid flow imaging portion 760 of the fluid flow path 701 is now described. A further leg 761 of tee-connector 733 fluidly connects to an elbow 763, which in turn fluidly connects to a variable flow resistor, e.g., a variable valve, 765 controlled by manual knob 309. The user can increase/decrease fluid flow by activation of knob 309, which in turn opens and closes the fluid flow path at flow resistor 765. Flow resistor 765 fluidly connects to a port 313 and an exterior tube 315. Tube 315 connects to port 317, that connects to the portion of fluid flow path in the obstacle insert assembly 210. A further port 317 exits the assembly 210 at the front of the housing and fluidly connects to a tube 315. A second port 313 connects to tube 315 and reenters the housing. A further tubing 771 connects to leg 773 through an elbow 775 and tube 777.

The fluid typically flows in the direction shown and described above. If it is desired to reverse fluid flow, then one of the connections to the reservoir 207 is released. The fluid flow automatically reverses direction based on the connections shown and need to continually circulate fluid to cool the light source. The fluid flow may also be reversed by insertion of a valve to block fluid flow. In an example, such a valve may be placed in tube that is closely adjacent the reservoir, such as tube 717, 719 or in place of connector 721. Other positions of such a valve are within the scope of the present disclosure.

The fluid flow path is configured to allow fluid to flow even with the reservoir 205 removed from the fluid flow path. The reservoir 205, may be removed from the path when further fluid is added to the reservoir or seed particles are added to the reservoir, for example. Such continuous fluid flow cools the light source and does not require the pump to be turned off when the reservoir is accessed by the user.

Fluid flow measurement devices 791, 793 are optionally connected to the at least one and preferably separate portions of the fluid flow path. In an embodiment, at least one fluid flow measurement device 791 or 793 is fluidly connected to a tubing outside the housing. The FIG. 7 illustrated embodiment shows the measurement device 791 in tubing 315 on the right and the measurement device 793 in separate tubing 315 on the left. As a result, one of the fluid flow measurement device 791, 793 is on the inlet side of the obstacle insert 210 and the other is on the outlet side of the obstacle insert. It will be recognized that either measurement device can be placed elsewhere in the fluid flow path. The measurement devices 791, 793 can be pressure transducers to measure the fluid pressure at the location in the fluid flow path. For example, in the illustrated example, the devices 791, 793 can measure the pressure differential across the obstacle insert 210 at a certain flow rate. The devices 791, 793 can further include flow rate sensors to determine flow rate. As a result, the pressure drop across the obstacle insert at a measured flow rate can be measured. In operation, a user can measure the pressure and flow rate absent an obstacle in the insert 210. An obstacle is then placed in the insert 210 and a second measurement is taken. From this the pressure drop due to the obstacle can be calculated, i.e., the difference between the no-obstacle measurement and the obstacle measurement. The measurement devices 791, 793 can further be connected to the I/O of the fluid flow device 110 such that the data measured can be stored or sent to the remote users and control unit. Thus, this data can be correlated to the fluid flow image data taken by the imager.

The fluid flow path and the elements that define the fluid flow path are adapted to fluidly confine and allow the flow of different types of liquids. Accordingly, different types of liquid can be analyzed and studied. In an example, different transparent fluids with different viscosities can be used to study different Reynolds numbers, e.g., inertial forces/viscous forces. Such study can teach students the difference between laminar flow and turbulent flow.

FIGS. 8A-8E show various embodiments of a fluid flow obstacle insert 800. The description of the common features of insert is shown in FIGS. 8A-8E with use reference numbers absent any alphabetic suffix. Discussions of individual insert with use an alphabetic suffix that corresponds to the figure. Insert 800 includes a base 805 that supports a shaped obstacle 810 upstanding from an upper surface of the base 805. Base 805 is shaped generally like a rectangular prism with a volume that is only slightly smaller than the recess in the base of obstacle assembly. Other shapes are also within the scope of the present disclosure such as equilateral shapes, e.g., equilateral triangular prisms. The base 805 includes a height such that it is essentially co-planar with the lower surface of the fluid flow path in the obstacle assembly. This results in the base having little effect on the fluid flow in the fluid flow path. The base 805 may further indicate the field of view of the imager so that the user will know the intended view. The obstacle 810 on the other hand extends outwardly, as shown upwardly, from the base 805. The obstacle 810 is intended to be directly in the flow path with the base 805 inserted in the recess of the obstacle assembly base. The obstacle 810 will cause the fluid in the fluid flow path to alter course and as a result cause fluid to demonstrate various important aspects of flow phenomena, such as rotational flow, flow separation, turbulence, flow interaction with boundaries, etc. The use of different obstacles will thus be a learning tool for a student studying various fluid flow phenomena. The base 805 being equilateral results in the obstacle 810 being placed with any side toward the incoming flow. Non-equilateral obstacles can also be used with various embodiments of the present invention. The obstacles can be of any shape of interest to demonstrate fluid flow phenomena. The obstacles can further be mounted such that they move on the base in response to fluid flow. In an example, the obstacle is a pinwheel or waterwheel shape that will rotate as the fluid flows past the obstacle. In a further example, the resistance to rotation can be adjusted. For example, a nut could be tightened on a bolt that secured the movable obstacle on the base. Thus, the user can adjust the freedom of movement of the obstacle. The orientation of the obstacle can also be changed and the bolt can be fully tightened making the obstacle immovable at a fixed orientation. Accordingly, each of the obstacles 800 of FIGS. 8A-8E can provide four different flow obstacles based on their orientation in the recess. For example, the obstacle 810A of FIG. 8A has a three dimensional shape with a triangular cross section. The hypotenuse side surface can face the inflow of fluid such that the user can view, sample, and study the affects of fluid flow striking this surface and flowing around a vertex side and a short flat side with the long flat side facing the outflow of fluid. The entire obstacle 800A can be turned such that the short flat side faces the inflow of fluid by simply removing the insert assembly, opening the assembly, lifting the insert, rotating the insert, replacing the insert, closing the assembly, and reinserting the assembly into the fluid flow device. In general, the number of different fluid flow paradigms each inert 800 represents is determined by the number of sides of the base 805.

The inserts can be transparent (for example made from acrylic or other clear polymer) allowing light to pass through the obstruction and illuminate the fluid on the other side of the obstruction. This will allow student user to observe fluid flow all around an obstacle, such as a complete cylinder, aerofoil or other obstacle shapes. Depending on the number and position of light sources, some orientations may be preferable (obstacle may block the light source to some of the particles depending on orientation, or in the case of transparent obstacles, may bend the light and may potentially produce artifacts in the image). The inserts are designed in a way such that at least one orientation will minimize such effects. The translucent parts in the flow model assembly are reinforced with metal plates to ensure an even seal on an o-ring in the flow model assembly, in an embodiment. These plates also ensure robustness of the flow model assembly and create a good seal, otherwise uniform pressure is not applied and the fluid may leak Each of the obstacles 805B-805E will now be discussed.

Obstacle 805B includes base 805, which is the same for all obstacles so that the base fits the recess in the intermediate member of the obstacle assembly 210. The obstacle 810B includes an upstanding solid geometric structure with three straight, flat and planar sides, a fourth concavely curved side surface. The top surface is flat to mate and possibly fluidly seal against the cover 435 of obstacle assembly 210.

Obstacle 805C includes base 805 and an obstacle 810C that includes three flat, planar sides (with two the same length and the third significantly shorter). A fourth side opposite the short side is convex.

Obstacle 805D includes base 805 and a rectangular prism obstacle 805D. None of the sides of the prism are the same length.

Obstacle 805E is a triangular prism that is offset from toward the leftward side of its base 805E with one leg 831 of the triangle being longer than the others 832, 833. Leg 832 is positioned adjacent one side of the base 805E. The vertex of sides 831, 833 is positioned at about the center of base 805E.

Figure 18:
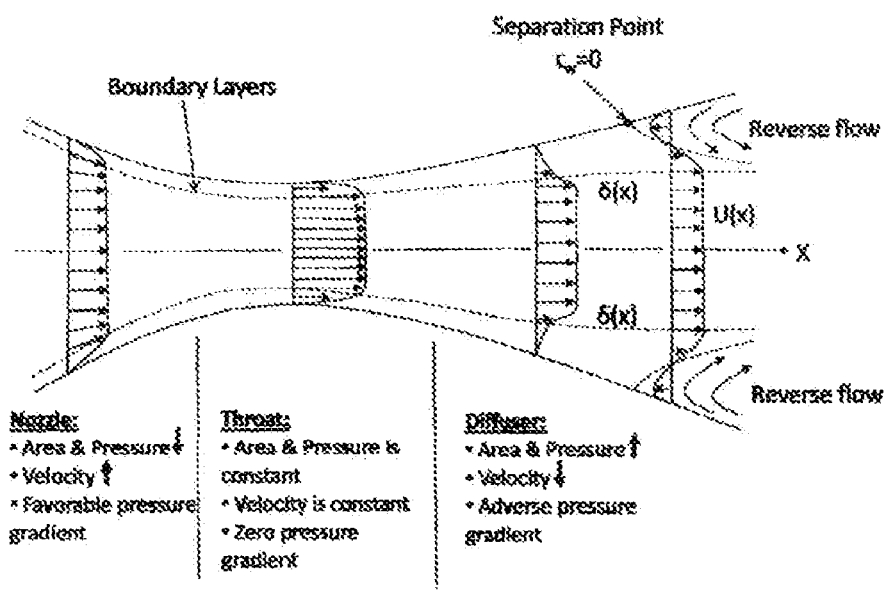
FIG. 18 is a flow phenomena diagram according to an embodiment.

Other obstacles can also be used. These other obstacles can place a flexible plate in the fluid flow path. Such a plate can be moved on the fluid flow. The plate may further be cantilevered such that one end of free to move based on the forces of the fluid flow. Other obstacles can simulate airplane wings or hydrofoils. Still other obstacles can simulate a nozzle, a throat, or a diffuser. The flow separation phenomena can be studied very well with the present system 1000 by using various flow models and by varying the speed of the flow the separation effects can be observed visually. The flow models, i.e., inserts with obstacles, can model a nozzle, a throat, or a diffuser. The obstacle portion of the insert would follow the shape of the top and bottom edge of the diagram shown in FIG. 18. The flow phenomena that we can observe can be summarized in the diagram shown in FIG. 18. It will be recognized that the insert need not include each of these different flow structures. The boundary layers, velocity, and pressure gradients for each of these flow structures can be studied, imaged, visualized, and calculated. See for example, "Mechanics of Fluids," B. S. Massey, Chapman & Hall, ISN 0 412 34280 4 and "Fluid Mechanics," Frank M. White, McGraw-Hill Book Company, ISBN 0 07 069673X, hereby incorporated by reference.

Flow separation occurs because of excessive momentum loss in the boundary layer near a wall. This loss can be initiated by an adverse pressure gradient where dp/dx>O. Flow separation can occur in a diffuser or a sudden expansion. In the diffuser flow separation will occur at one or both walls if the diffuser angle is too large leading to excessive adverse pressure gradient. Flow separation will result in reverse flow, increased losses and poor pressure recovery. This is called a diffuser stall. In a favorable pressure gradient—like in a nozzle—where dp/dx<O flow separation can never occur. Separation occurs when δu/δy=0 (or $\tau_w$=O) where $\tau_w$ is the wall shear stress. The boundary layer may become turbulent once the laminar layer separates. Separation streamline is the line of zero velocity dividing the forward and reverse flow, and it starts from the separation point. The reverse flow causes large irregular eddies. These eddies are undesirable because of energy loss. The separated boundary layer curls, and the disturbed flow region continues downstream. The imager can clearly image these effects and provide the data to multiple users as described herein. The pressure downstream remains approximately the same as at the separation point because the energy is dissipated as heat.

Both laminar and turbulent boundary layers separate, but laminar layers tend to separate more easily. This is because the laminar flow velocity gradient from the wall is lower and the adverse pressure gradient can more rapidly halt the slow moving fluid near the wall, e.g., the wall of the fluid flow path or tubes described herein. A turbulent boundary layer is more resistant to adverse pressure gradient. However, greater the adverse pressure gradient quicker the separation for both laminar and turbulent flows. The boundary layer, δ(x), thickens rapidly in an adverse pressure gradient, and one can no longer assume that δ(x) is small. The boundary layer separation greatly affects the flow as a whole. A wake of disturbed flow downstream is formed which radically alters the flow pattern. Such a wake can be imaged and displayed to users according to the teachings herein. The effective boundary of the flow is an unknown shape—which also includes the zone of separation—instead of the wall. The altered flow pattern may cause the position of the minimum pressure to move upstream. This may result in the point of separation moving upstream. Flow separation becomes very important in the design of aerodynamics. For example, flow separation increases drag in racing cars or airplanes. The present system can further image flow separation caused by sharp edges that can be studied by the user.

Still other obstacles can include variously shaped recesses in the obstacle insert. Examples of recesses include any upstanding shape described herein, but recessed into the upper surface of the obstacle body.

Figure 9:
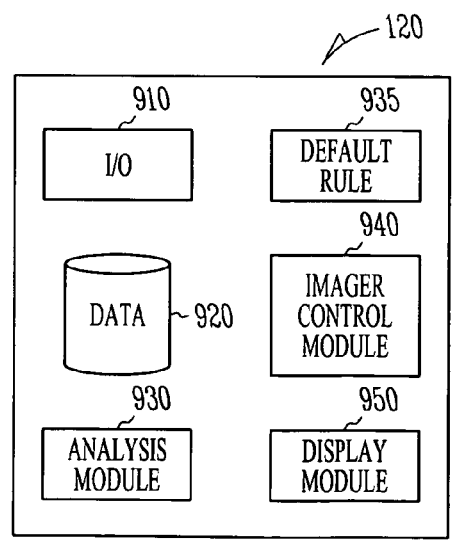
FIG. 9 is a view of a control unit.

FIG. 9 is a view of a control unit 120 remote from the fluid analysis device 110. The control unit is to receive data from the device 110 and instructions from the users. This data can be transmitted wirelessly or over a wired network. At times using this received data and instructions, the control unit sends control signals to the fluid flow analysis device 110. The control unit 120 can be a server with appropriate storage and rule sets. The control unit 120 depicted in FIG. 9 includes an input/output module 910 that provides communication between modules in the unit 120 and outside devices, such as communication over networks to the fluid flow device 110. In particular, the I/O module 910 is adapted to receive image data from the imager. The I/O module 910 may further include data transfer devices such as a universal serial bus, serial bus, disk drives, or further global computer connections such as the Internet. The I/O module 910 may further include a network interface device is to provide connectivity between the control unit to a network using any suitable communications protocol. Examples of communications protocols include wireless protocols such as Institute of Electrical and Electronics Engineers (IEEE) 802.11a/b/g/h and IEEE 802.16., Ethernet IEEE 802.3x, TCP/IP, and the like. The network can be the Internet, an intranet, a local area network (LAN), a wide area network (WAN), and a cellular network based on GSM and TDMA, as examples. It will be recognized that the I/O module may connect to one type of network or any number of networks of the same or different types. If a standard network is used, it will further be recognized that the I/O module may further utilize network browsers such as Internet Explorer, Mozilla, Opera, etc. and may use a standard operating system such as GNU/Linux, MS-Windows, or Mac-OS. The I/O 910 may further provide a digital key to the fluid flow device I/O 235 to allow operation of the fluid flow device 110. The I/O module 910 is further adapted to provide communication with a plurality of users. A group of users may be using the same fluid flow device. This will be helpful for group projects and labs in undergraduate coursework. A group of users may each individually be using separate fluid flow devices using a same control unit. This will allow a central control unit to control a plurality of fluid flow devices to centralize programming and provide improved updating and troubleshooting of the control unit. This can also allow a professor to stage example of principals of fluid dynamics being studied and show the students actual, an possibly real-time, fluid flow examples, whether or not the students are remote.

Control unit 120 further includes data storage 920 to store raw data from the fluid flow device, to store control parameters at the time of producing the raw data, and to store analyzed data that has been processed according to fluid flow dynamics. An analysis module 930 is provided to apply the analysis rule sets to the data stored in the data storage 920. The analysis module can perform particle image velocimetry analysis. The module may further operate and the data to add color to the images generated by the data. A default rule set 935 is stored in the control unit 120. The default rule set 935 includes the base control parameters for control of the fluid flow device 110 and the login in requirements for users, such as students, to access the control unit and hence the fluid flow device 110.

An imager control module 940 is provided to control the imager in the fluid flow device. The imager control module 940 will store the parameters for the particular imager in the fluid flow device 110. The imager control module 940 will further allow the users to change certain parameters to improve the results of the fluid flow analysis. Examples of such parameters are brightness, exposure, gain, etc.

The control unit 120 further includes a display module 950. The display module 950 can present the images and videos from the fluid flow device in essentially real-time such that a data collection period can begin after the user can see that the system 100 is working and good data can be acquired. Further, the display module 950 can provide a user friendly and familiar interface between the hardware and software of the system 100 and a novice user. This will aid in use of the present system as a teaching tool. The display module 950 and other modules can be used via a user friendly interface, such as a web browser.

The above modules may reside in a single computer, or can be distributed across multiple computers connected via a network or a bus. A plurality of user interfaces or front-end servers may receive requests and communicate with appropriate modules, and forward back their replies. Front-end servers may connect to plurality of controllers which then can be connected to plurality of devices. A plurality of analysis servers or storage servers may also be used.

Fluid flow device and the controller device may be merged. The controller device may be embedded within the body of the fluid flow device and connected to the camera internally.

Figure 10:
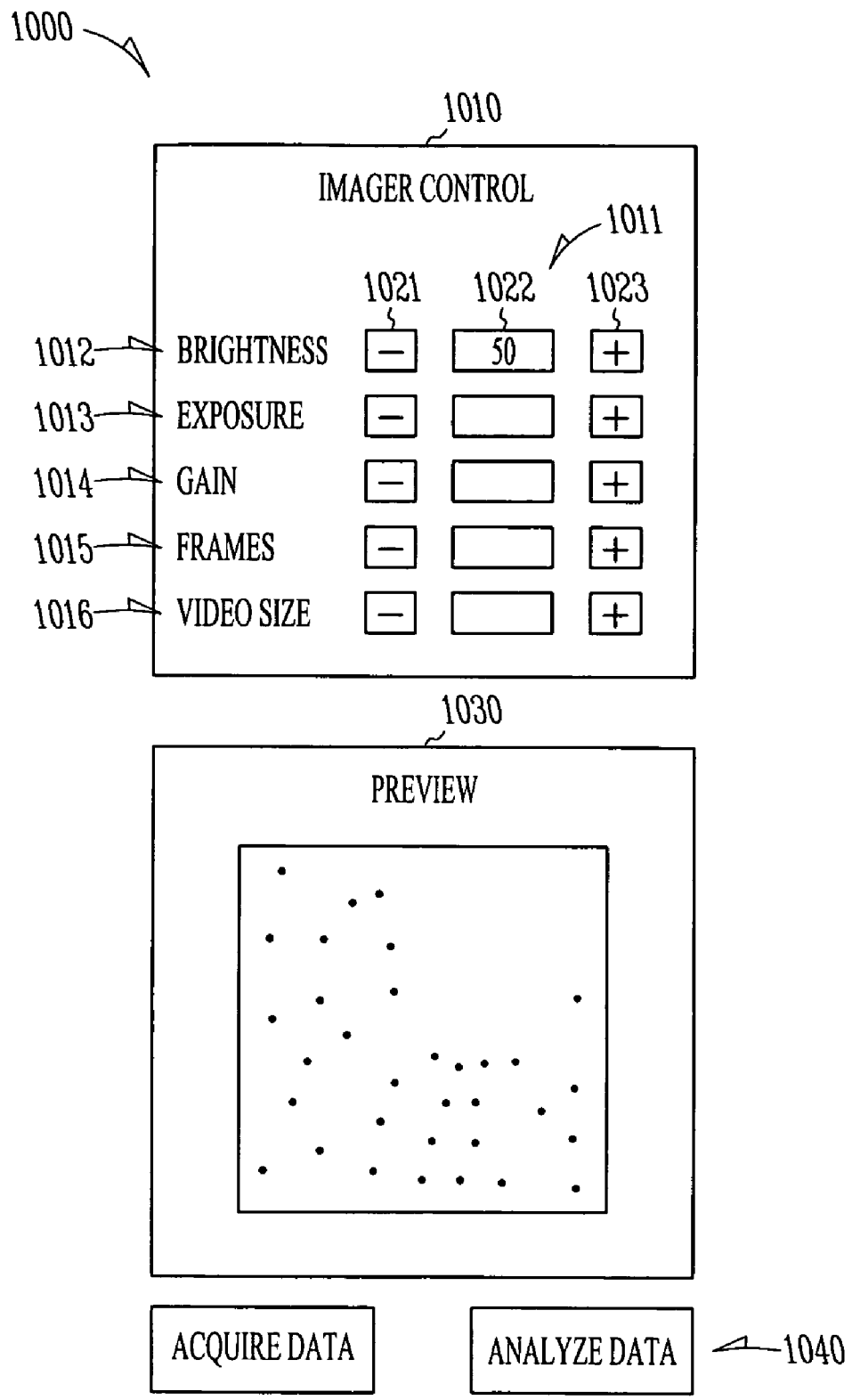
FIG. 10 is a view of a graphical user interface.

FIG. 10 is a view of a graphical user interface 1000 that may be used with the control unit. The graphical user interface (GUI) 1000 provides display of graphics including symbols, interactive buttons or fields, data displays and other representations to a user. GUI 1000 can be remote from the fluid flow device and communicate to the elements of the fluid flow device through a communication channel, e.g. as described herein. GUI 1000 provides a user friendly device to allow the user to control operation of the fluid flow device and acquire fluid flow data. GUI 1000 includes an imager control 1010 and a fluid flow data preview 1030. Imager control 1010 includes a plurality of control settings 1011 for the imager. These control settings 1011 include by way of example, but are not limited to, brightness 1012, exposure 1013, gain 1014, frames 1015, and video size 1016. Brightness 1012 controls the overall brightness of the image acquired by the imager. In an embodiment, brightness is set to a medium-high value for visualization (i.e, for a preview image), and to a medium-low value for actual data acquisition in particle image velocimetry. In some setups, artifacts such as small bubbles stuck to various surfaces may be present. To correct for such artifacts, the seed particles are chosen to be brighter than the artifacts. The user can use the present GUI 1000 to lower brightness (and adjust gain and exposure) to a point where the seed particles imaged brighter than the artifacts such that the remaining artifacts are not imaged or the not outside general data errors. Generally, for PIV, it is desirable to have bright particles with high contrast from the background. Ideally, everything other than the particle seeds are as dark as possible. Exposure 1013 controls the time the image sensors are going to be exposed per frame. If this value is high, sensors are going to be exposed longer, resulting in longer streamline effects as the particle seeds being imaged are moving. For PIV analysis, exposure is as low as possible to obtain a fast snapshot of the particle seeds as points rather than streamlines. However, when exposure is low, fewer photons hit the image sensors in the duration allocated per frame (i.e., exposed to photons), so the particle seeds will appear dimmer. One way to compensate for the dimmer particle seed images is to increase the gain. Gain 1014 controls how sensitive the image sensors are per unit time. Increasing gain amplifies the image data. However, increasing gain also increases the noise in the signal, and hence in the data. Frames 1015 controls the number of frames that will be captured in an individual data acquisition session. It is desirable to keep this value low when adjusting the settings for fast response, and set this value to a higher value when the settings are satisfactory. Video size 1016 controls the scaling factor for the purpose of generating a video image. For fast experimentation, it may be preferable to reduce the size to 50% or 25% and increase it when the optimal parameters are found. This is to control the size of the visible image, such as that shown in the preview 1030. The acquired PIV data need not be affected by this setting as the data is always available full-size. Smaller video image sizes are useful to reduce latency experienced by users during heavy network traffic periods or with users having low bandwidth connections The settings 1011 can further include user manipulatable fields 1021, 1022, 1023, which allow that user to change the settings. As shown, each of the control settings 1012-1016 each includes three fields. However, three fields may not be required for an individual setting or additional fields may be required. Changing the number of fields for an individual setting is within the scope of the present disclosure. As shown in FIG. 10, there is a decrease field 1021, a value field 1022 and an increase fields 1023. As these input fields can be replicated for each control setting 1012-1016, only one will be described in detail for clarity of description. The value field 1022 shows the current value for the respective control setting, as shown in FIG. 10 brightness. On one side of field 1022 is a decrease field 1021. On the other side of field 1022 is an increase field 1023. When the user selects the decrease field then the value of that setting, which is shown in field 1022, is decreased. When the user selects the increase field then the value of that setting, which is shown in field 1022, is increased. The fields 1021 and 1023 can be graphical buttons that are highlighted when selected, i.e., pressed using an input device such as a mouse or other pointing device, and change the value of the respective control setting by one. The fields 1021 and 1023 may further be continually selected to rapidly change the value of the respective setting. Value field 1022 can show the absolute value of the setting. In an alternative, the value field 1022 shows the percent of the maximum (i.e. 0-100) for any given setting. This can make the system easier for a student or other novice to control the imager without learning the specifics and absolute values of settings such as brightness, exposure, gain, frames, video size, etc. The remote user or the fluid flow device translates the percent settings into appropriate setting values that the imager can understand. In the embodiment with a plurality of users, each of the users is shown the current value of the settings in field 1022 shown on their respective remote user terminal. In an application, only one user may change the settings. In another application, each of the users can change the settings. This allows the users to collaborate and possibly teach each other how changing the settings can affect the fluid flow data that is being acquired.

The fluid flow data preview 1030 is a display field that shows the image data being acquired by the imager is shown to the user. The preview 1030 includes a video presentation of the image data. The preview can be sample of the image data. The preview can change when the imaging control settings 1012-1016 are changed. This graphic of the image data being shown to the user provides the user with an essentially real-time view of fluid flow in the fluid flow device at the obstacle. The user can change the settings of the imager to improve the data quality.

The GUI 1000 further includes navigation links 1040 that allow a user to navigate to different graphical user interfaces or other modules of a fluid flow visualization/data acquisition program. These links can include, but are not limited to acquire data and analyze data. Other links can include end, log off, link to other materials related to this field of study, link to class/lab websites, link to website associated with the present system for support or tutorials. Other links can be provided.

Figure 11:
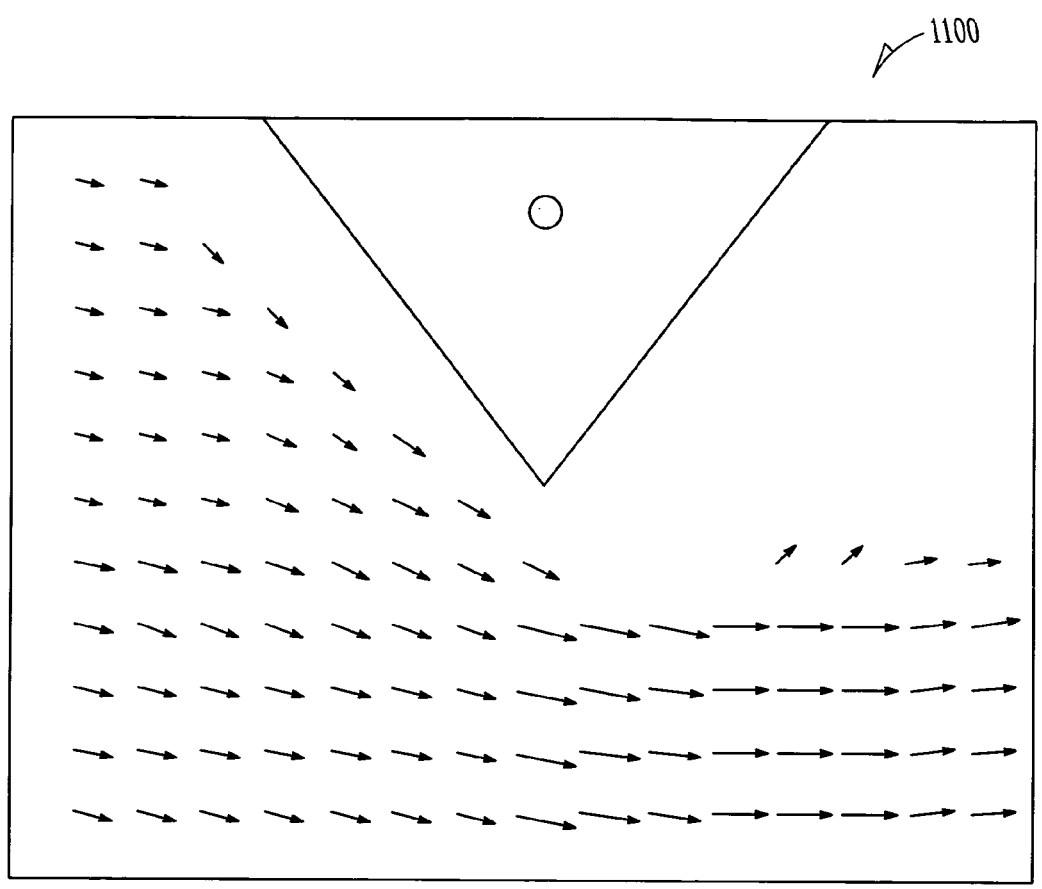
FIG. 11 is a display of data acquired according to an embodiment of the present invention.

FIG. 11 is a visual representation of data 1100 acquired using the system 100 described herein. The data can be displayed on a display device such as a computer monitor or other electronic display. The visual representation as shown in FIG. 11 is a vector field overlaid on a frame of data. The vector field is one presentation of data computed from the raw image data acquired by the fluid flow device. Other data can be computed from the experimental data acquired using the fluid flow device and the controls. Computed data can be calculated and graphically presented to a user. Examples of such data include streamline, voracity, shear stress, shear strain, turbulence intensity, etc. Computation can be performed in the analysis module 930 of the control unit 120 (FIG. 9).

The operation of the system 100 will now be described. In an example, user must install the software or logon to the control unit 120 to use the fluid flow device 110. A user's own computer can be connected to the fluid flow device 110 and the software installed from a storage media or downloaded over a network. The software will detect the various hardware and device software and install the proper fluid flow system software. In an example, the user needs to merely point their web browser to the name of IP address of the server on which the software is loaded or the DNS name of the machine acting as the server. Thus, no software needs to reside on the user's computer, which allows the user's computer to be compliant with the server and use of the present invention generally independent of the user's computer hardware or software. Software of the present invention is then only needed for the server and the users' computers only need functional web browser and network connection software, which is readily available in most notebooks/computers.

Fluid flow device 110 can now be set up for an experiment. The window 437 in the fluid flow model insert 310 is cleaned as a unclear window will result in poor data. The obstacle insert is selected and placed in the recess of the intermediate member 433 of the insert 310. The cover 435 is positioned over the intermediate member 433 and fluidly seals this portion of the fluid flow path. The insert is then slid into the slot in the front of the housing 301. When fully inserted, the insert 210 or 310 is releasably held in the housing slot and activates the switch to allow the light source 220 to be powered and the pump 205 to be fully powered. Connectors fluidly connect the insert to fluid flow path, for example, the tubing that is exterior to the housing as shown in FIGS. 3 and 7. The reservoir can then be filled with a fluid. In an example, the fluid is water. The fluid is then seeded with particles that will be visible when illuminated by the light source but will not impact the fluid flow. The seed particles can range in size from 1 micron to about 100 microns depending on the density of the transparent working fluid and Stokes number. The seed particles can be made from nylon, polyimid, polystyrene, among others. In an example, the particles are polyimid for density matching with the flow medium. The particles can be coated particles to maximize the reflected light. Particles can also be fluorescent. The particles are placed in the fluid filled reservoir.

The fluid flow device can be connected to the control device at any time. The fluid flow device can now be powered on. The light source and the pump will start as the switch is on. The associated control software or methods should be started at the control unit 120. Images of the flow should now be displayed at the control unit. A user at the fluid flow device can now manually slow the fluid flow or speed the fluid flow by adjusting the knob that controls the fluid flow resistance. In one embodiment, the flow speed can be controlled using an electronic valve connected to and controlled by the control unit 120. In this embodiment, the flow speed can be manually adjusted at valve 309.

When beginning a new experiment, there may be air bubbles in the fluid flow path. One method for removing air bubbles is squeezing and releasing the tubing external to the housing. This moves the bubbles within the fluid flow path and possibly moves any bubbles to the reservoir. If the bubbles persist, then a syringe can be connected to one of the connections and used to gently move the bubbles. Alternatively, the syringe can be used to add fluid that can move the air bubbles along without turning off the device 110. In use, the syringe can pull liquid and the bubbles out of the flow path. The gas that forms the bubbles and the liquid are separated in the syringe. Thereafter, the liquid is injected back into the fluid flow path. Cleaning the surface of the window 437 also reduces the chances of air bubbles sticking to the window which can restrict the optical path to the imager. Transparent or semi-transparent tubing help identifying and alleviating bubble related issues faster and easier.

The flow model insert 210 or 310 can be changed with the device 110 in operation. The fluid flow path is disconnected from the insert 210 or 310. The fluid will continue to flow to cool the light source. The insert is removed from the slot in the housing. The electrical control switch moves to the "off" position that places the pump in a reduced power mode and turns the light source off. The obstacle 800 can now be changed in the insert assembly.

The imager is controlled remotely by the control unit 120 to acquire data from the fluid flow device 110. The user can control many parameters of the imagers as described herein. The acquired data can then be analyzed and used remotely from the device 110. The control unit 110 provides a networked imager control with essentially real-time visualization of the image data such that the user can adjust at least the imager parameters to achieve the best results. The control unit can connect to the fluid flow device through any electronic network using any operating system via a web browser.

The control unit can export the acquired data or analyze the data for a user. The data can be exported in a plurality of formats for additional analysis using other software. Examples of these formats include text, png plots, post script, piv files compatible with GPIV, an open source particle image analysis program.

Figure 12A:
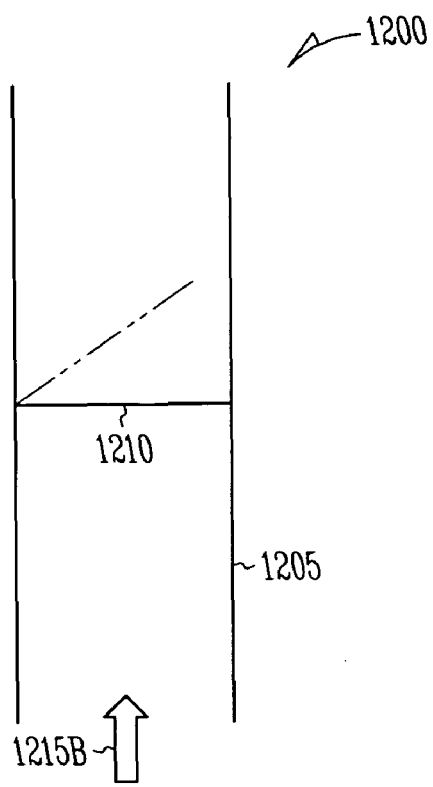
FIGS. 12A and 12B are schematic views of an application of the present system.
Figure 12B:
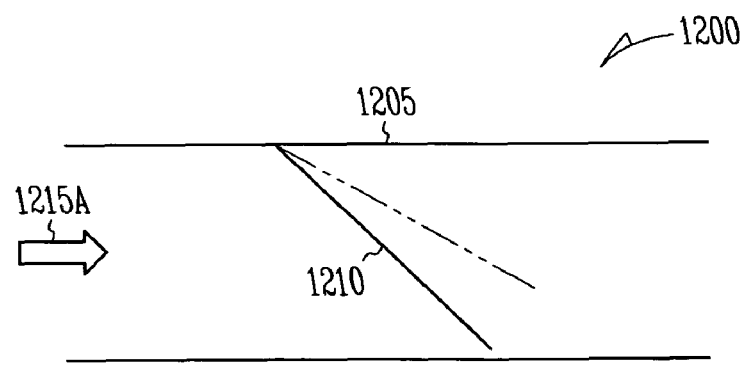

FIGS. 12A and 12B show a schematic view of an application 1200 of the present system 100 for use to provide a visual learning, teaching or experimental tool for fluid pressure versus fluid flow. In some embodiments of the present invention seed particles are not required. One such embodiment is illustrated in FIGS. 12A and 12B. Each of FIGS. 12A and 12B schematically show a portion of a flow path 1205. This fluid flow path portion could be any portion of the fluid flow path of the fluid flow device described herein. In one embodiment, the fluid flow path portion shown in FIGS. 12A and 12B is positioned at the location where the image can acquire image data. FIG. 12A shows an application where the fluid flow path is vertical. FIG. 12B shows an application where the fluid flow path is horizontal. Each of FIGS. 12A and 12B includes a thin flexible plate 1210 within the flow path 1205. In an embodiment, the plate 1210 is connected to an obstacle insert to be placed in the fluid flow obstacle assembly and placed in the field of view of the imager. The fluid flows in the direction of arrows 1215A and 1215B, respectively. Referring now to FIG. 12A, the fluid flow impinges on the surface of the plate 1210, which surface faces the inflow of the fluid. As a result the fluid deflects the plate 1210 upwardly away from the inflow such that the fluid can flow past the plate. The movement of the plate 1210 is shown in broken line in FIG. 12A. Referring now to FIG. 12B the plate 1210 is positioned loosely adjacent one side of the path 1205. It will be recognized that the distance from the side of the path is exaggerated for purposes of illustration. The flow of fluid 1215B past the plate 1210 may force the plate away from the sidewall and out into the fluid flow as shown by the broken line in FIG. 12B. As the fluid velocity increases, the plate 1210 will be deflected more because of the higher pressure. However, the FIG. 12B embodiment may be self-limiting. These embodiments can provide a further visualization of fluid dynamics for teaching and understanding of the complex forces in this field of study.

Figure 13:
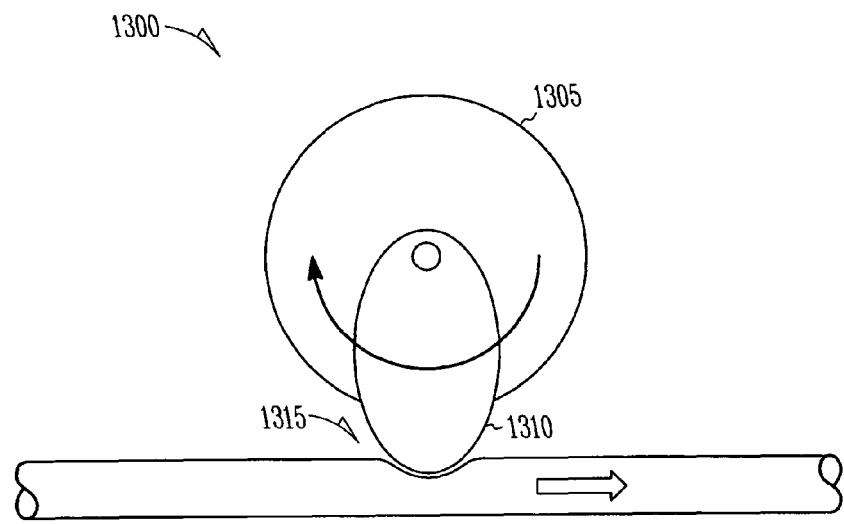
FIG. 13 is a schematic view of an application of the present system.

FIG. 13 shows a system 1300 to simulate blood flow in the present system 100. System 1300 includes a motor 1305 to drive a cam 1310 into periodic contact with a flexible portion 1315 of the fluid flow path. This portion of the fluid flow path 1315 can be a flexible, transparent silicon tube to simulate a vein or artery. The motor 1305, cam 1310 and fluid flow portion 1315 are positioned with the housing, e.g., 301. The motor 1305 could be controlled to drive the cam 1310 into contact with fluid flow path portion 1315 to simulate a heart beat. The fluid flow path is flexible and resilient such that the cam 1310 deflects a portion of the path, which in turn springs back to its normal size when the cam 1310 moves from contacting the path 1315. In another example, the cam 1310 is shaped such that its revolution movement creates the heart beat fluid flow in the fluid flow path. In one aspect, the motor and cam are positioned away from the obstacle insert assembly such that the obstacle insert used could represent blockages in a persons circulatory system. The present application is not limited to people, the motor and cam could be controlled or selected to mimic other animals.

In a further embodiment, the pump 205 is configured to output fluid flow that mimics a heartbeat. The pump can produce pulsating fluid flow at various frequencies; some of which can closely mimic a heartbeat. A fluid that more closely mimics blood viscosity can also be used. One example is a medium sucrose solution as the fluid. Some of the seeding can be sized to represent cells, such as red or white blood cellsa.

Figure 14A:
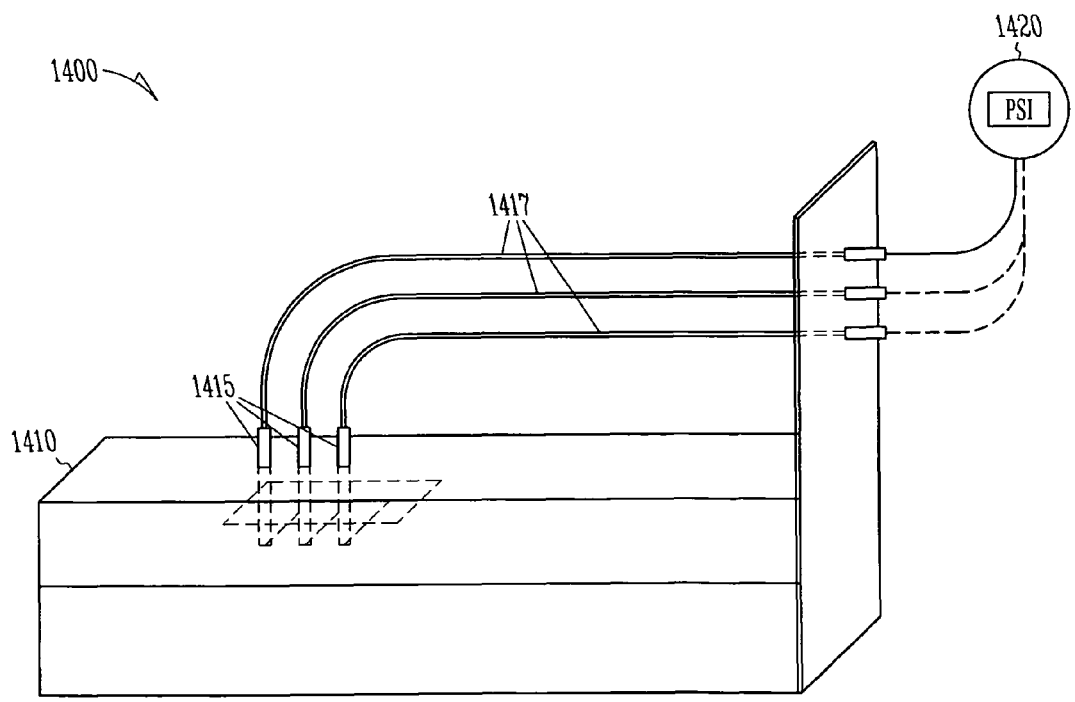
FIGS. 14A-14D are schematic views of an application of the present system.

FIG. 14A show a schematic illustration of a pressure measurement system 1400 that includes fluid flow insert assembly 1410 with luers 1415 connected thereto. The luers 1415 fluidly connects via fluid connections 1417, such as vias or tubes, to a pressure gauge 1420. The illustrated embodiment includes three luers with three respective fluid connections. It is within the scope of an embodiment of the present invention to include a single luer 1415 and fluid connection 1417. In another embodiment, any plurality of luers 1415 and connections 1417 are provided. The flow assembly 1410 is similar to the assembly described elsewhere in the present documents unless otherwise noted.

Figure 14B:
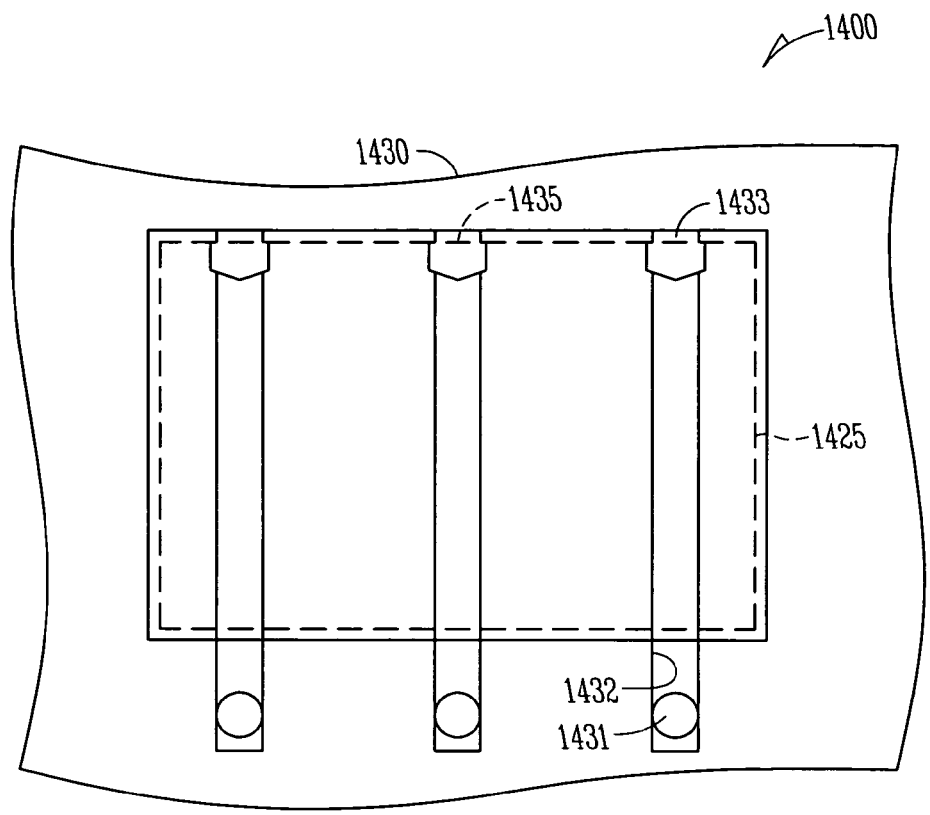
Figure 14C:
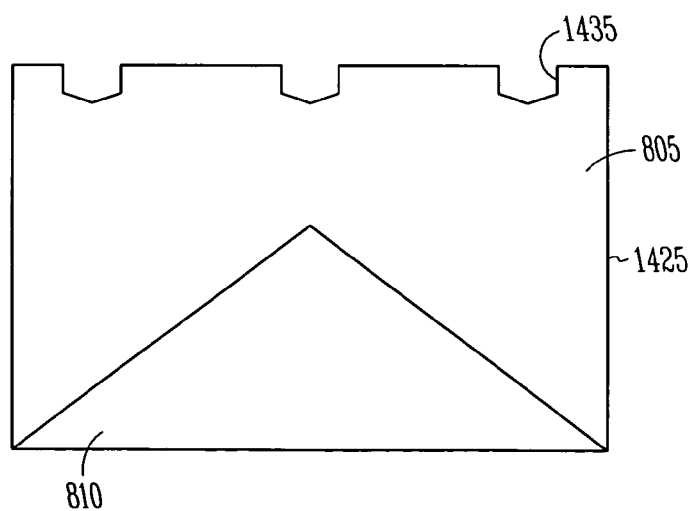

FIG. 14B is a top, partial view of the portion of the fluid flow insert assembly 1400 that receives an obstacle 1425. The obstacle 1425 is shown in broken line to indicate that it is removable from the recess 1428 in the bottom plate 1430 of the assembly 1400. A plurality of channels 1430 are formed in the assembly extending vertically downwardly from the top of the assembly 1400, i.e., vertical channel 1431, and then extending horizontally under the bottom surface of the recess 1428, i.e., horizontal channel 1432. An end portion 1433 of the horizontal channel 1432 is open to apertures 1435 at an edge of an obstacle insert 1425. Referring now to FIG. 14C, a top view of the obstacle insert 1425 for use with the pressure measurement system 1400. The obstacle insert 1425 includes a body 805 and an obstacle 810, which can be essentially the same as described herein but for the apertures 1435 in an edge of the body 805. These apertures will allow the pressure in the fluid to transmit from the fluid flow path through apertures 1435, to channels 1431, 1432, through luers 1415 and fluid connections 1417 to a pressure sensors 1420. The pressure sensor is mounted outside the housing of the system 110. In an embodiment, the pressure sensor 1420 records the pressure readings and sends same via an I/O connection to remote users.

The illustrated embodiments shown in FIGS. 14A-14C further show that the pairs of apertures 1435 and channels 1430 are positioned with one pair before the obstacle 810, one pair at obstacle 810, and one pair after the obstacle 810. This allows the pressure differences resulting from a specific obstacle insert to be measured at three different locations. Based on these values, Bernoulli's equation can then be calculated.

Figure 14D:
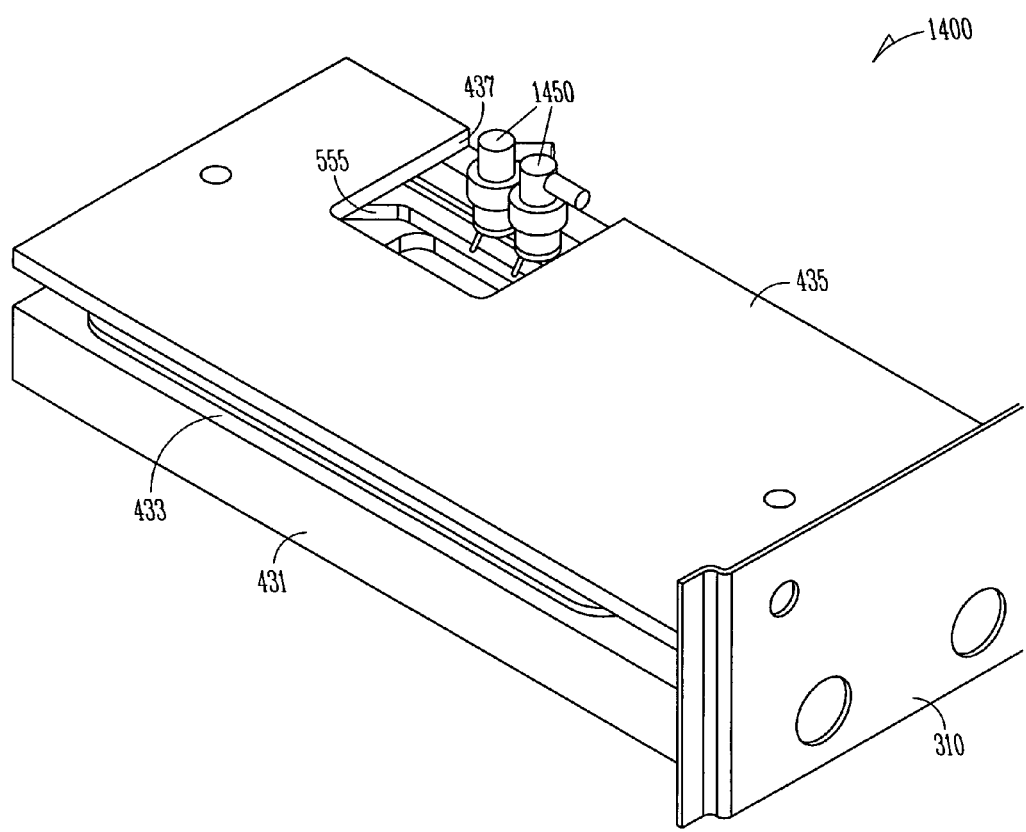

FIG. 14D shows an other embodiment of the insert 1400 including at least two connectors 1450 that are connected to fluid apertures that are adjacent the obstacle. These fluid obstacle can be the same as those described above with regard to FIGS. 14A-14C. The connectors 1450 and fluidly connected apertures are positioned to one side of the aperture 437 such that they do not obstruct the field of view of the imager (not shown in FIG. 14D). A portable pressure sensor (not shown) can be connected to the connectors 1450 and be positioned external to the housing. In another embodiment, the pressure sensor records the readings and sends same via the I/O to the remote users and the control unit.

Figure 15:
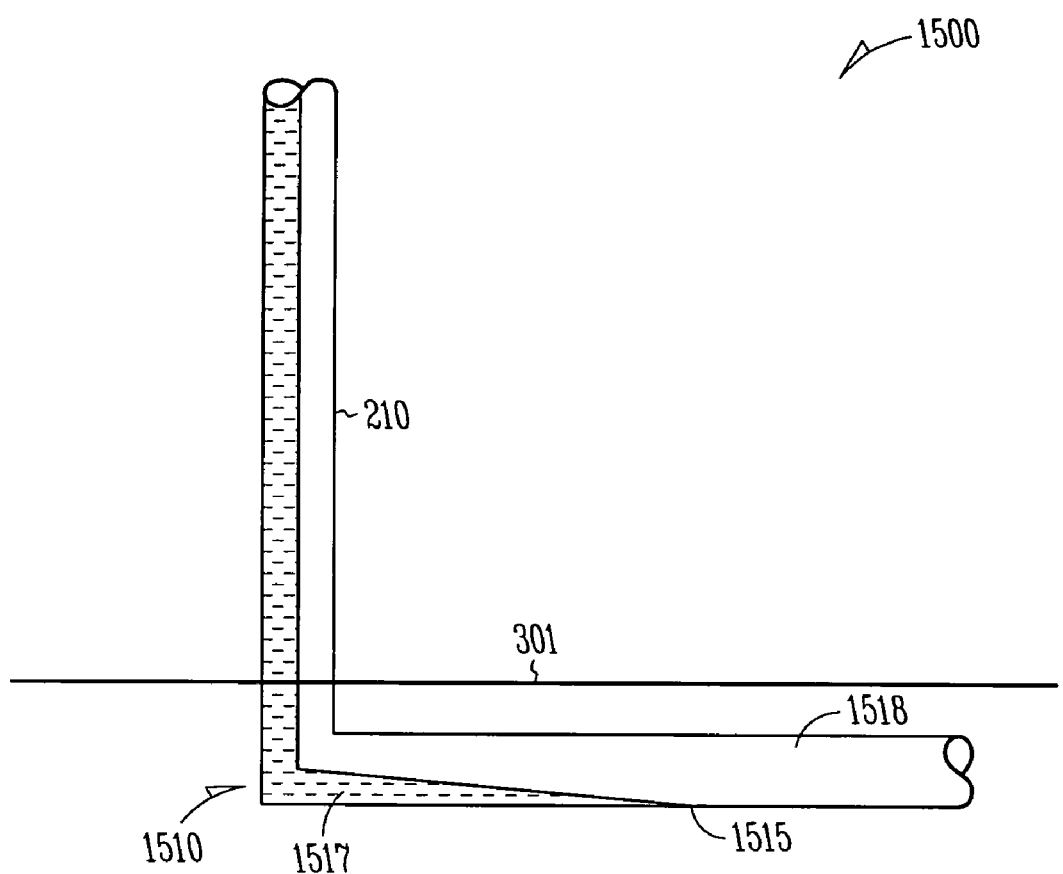
FIG. 15 is a view of a further embodiment of the flow model assembly.

FIG. 15 shows a schematic view of the fluid flow device 1500 being used to for teaching mixing flow phenomena. A portion 1510 of the fluid flow path is outside the housing 301 and includes an injection point 1515. The injection point can be a Tee junction or syringe accepting point. In use, the reservoir would not be completely filled as further liquid will be injected during experimentation. In an example, the reservoir is about ½ to ¾ full. At the injection point 1515 a liquid 1517, preferably different than the liquid 1518 already flowing in the fluid flow path, is injected. Both liquids 1517 and 1518 would flow into the insert 210 wherein the imager would record the flow of the two liquids past the imaging site. While described as two liquids, any plurality of liquids can be used. In an example, water is flowing in the fluid flow path. A higher density liquid, such as oil, is injected. In a laminar flow, the two liquids would not mix. Moreover, seed particles can be placed in each liquid and imaged past an obstacle as well to determine mixing effects of the obstacle. Other examples could include injection of soap into water.

The present system 100 is ideal for the educational environment as industrial or research particle image velocimetry (PIV) systems typical cost round $100,000. Moreover, there are safety considerations as these industrial PIV systems use high power lasers, such as class IV lasers. The cost and potentially dangerous components prohibit the use of such systems for educational purposes. The present inventors recognized these drawbacks of the industrial PIV systems and the need for hands on experiments to learn fluid flow dynamics. To achieve some of these goals, the present housing encloses all powered parts yet provides visual evidence of the device in an operational state by allowing some diffuse, indirect light from the light source to leak from the housing or by images from the imager.

Figure 19:
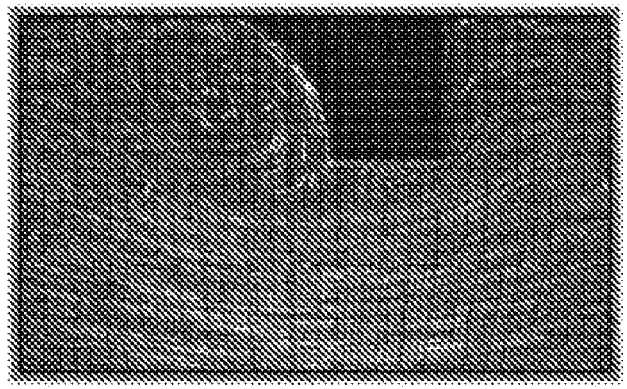
FIGS. 19-20 are example images produced by embodiment(s).
Figure 20:
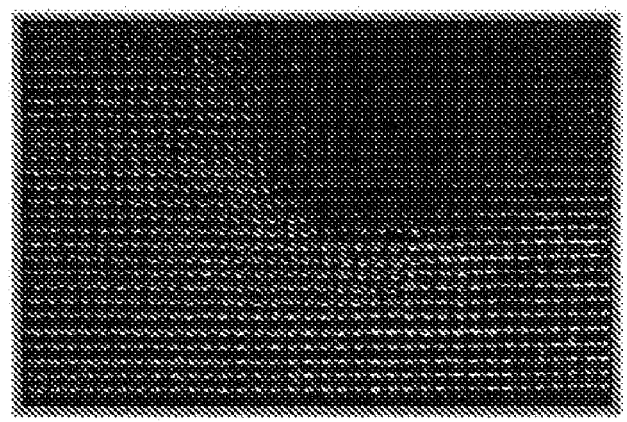

The present system can further record data that is later used in qualitative and quantitative analysis, for example, in the control unit or at remote user locations. The flow of a real fluid is very complex and, as a result, complete solution of problems can seldom be obtained without recourse to experiment. The present system provides the vehicle for such experiments without the need for expensive or dangerous equipment. Fluid mechanics is a highly visual subject. While using the present system the user(s) can learn about the flow qualitatively and quantitatively using particle image velocimetry (PIV). The most common mathematical method for flow visualization is the streamline pattern. All visualizations can be computed at the control unit and/or the remote user for display. Flow patterns can be described by lines and there are several types of lines. See for example, "Mechanics of Fluids," B. S. Massey, Chapman & Hall, ISN 0 412 34280 4 and "Fluid Mechanics," Frank M. White, McGraw-Hill Book Company, ISBN 0 07 069673X, hereby incorporated by reference. First, Streamline: this is an imaginary curve across which—at that instant—no fluid is flowing. It can also be called a flowline or line of flow. At this instant in time the direction of the velocity of every single particle on this line is along this line. The pattern, which several streamlines form, gives a very good description of the flow. Since the streamlines are describing an instant of time the patterns they form can be considered to be an instantaneous photograph of the flow. The present system shows these visualizations of flow when images of the particles moving fast through the flow model are taken. Second, Pathline: An individual particle in the flow does not necessarily follow the flow. So the actual path that a given fluid particle follows is called a Pathline. If one considers a streamline as an instantaneous photograph of the flow, a pathline is time exposure of the path of the particle at successive instants of time. Third, Streakline: This line is the locus of particles which have passed through a prescribed point. Another term used for this line is filament line. Traditionally a streakline can be produced experimentally by the continuous release of marked particles such as dye, smoke or bubbles. In the present system streaklines are produced using solid particles which are illuminated by a light source, such as a laser or light emitting diode. FIGS. 19-20 are two examples of images produced by the present system.

The present system can further provide a basis for the hands on study of flow in ducts. There is no general analysis of fluid motion. The reason for this is that very complex changes occur in fluid behavior at moderate Reynolds Numbers. At this introductory level Reynolds number is considered to be the primary parameter affecting transition from laminar to turbulent flow.

$$Re = \frac{\rho V L}{\mu}$$

Where V is the average stream velocity, p is the fluid density, p is the fluid dynamic viscosity, and L is the characteristic length. In an example operation of the present system water is used as the liquid. At 20° C., the density and dynamic viscosity for water are 998 kg/m3 and $1.003 \times 10^{-3}$ Ns/m$^2$, respectively. In non circular ducts, as used in an embodiment of the present system, hydraulic diameter can be used for L.

Hydraulic Diameter=(4×Area)/Wetted Perimeter

The value of Hydraulic diameter in an embodiment of the present system is constant. With the dimensions of the fluid flow path in the present system being 5 mm×25 mm, the hydraulic diameter is 8.33. As a result, the following approximate ranges occur for flow in the fluid flow path:

0<Re<1: highly viscous laminar, "creeping" motion.

1<Re<10$^2$: laminar, strong Reynolds number dependence

10$^2$<Re<10$^3$: laminar, boundary layer theory useful

10$^3$<Re<10$^4$: transition to turbulence

10$^4$<Re<10$^6$: turbulent, moderate Reynolds number dependence

10$^6$<Re<∞: turbulent, slight Reynolds number dependence

These values of Reynolds number a good indication of the flow regimes, but the values can vary with surface roughness, flow geometry, and inlet flow stream fluctuations. The flow in the present system is considered to be internal flow because the fluid is constrained by the bounding walls. The viscous boundary layers grow downstream of the entrance to the portion of the fluid flow path. This results in the retardation of the axial flow at the wall and acceleration of the center fluid so that the incompressible continuity law is satisfied.

In the present system, the users will be able to study flow not only in straight ducts but also flow over obstructions by inserting various flow model obstacles. One flow model studies the effect of reduction in flow area on the flow. The effect can be explained by considering the Bernoulli's equation:

$P/\rho g + u^2/2g + z$=Constant

Where, P is pressure and z is height. Bernoulli's equation only applies to frictionless (inviscid), steady and constant density flows. Bernoulli's relation is generally true only for a single streamline. The present system can image fluid flow in a horizontal plane and hence there is no significant gravitational effect on the flow. As a result, z can be eliminated from the Bernoulli's equation. If we consider the flow in a converging duct, continuity tells us that as the area gets smaller the flow speed increases. See for example, "Mechanics of Fluids," B. S. Massey, Chapman & Hall, ISN 0 412 34280 4 and "Fluid Mechanics," Frank M. White, McGraw-Hill Book Company, ISBN 0 07 069673X, hereby incorporated by reference. Also Bernoulli's equation tells us that as the speed increases pressure must decrease. The present system can use the computing power and systems to generate this type of data for a user.

Figure 16:
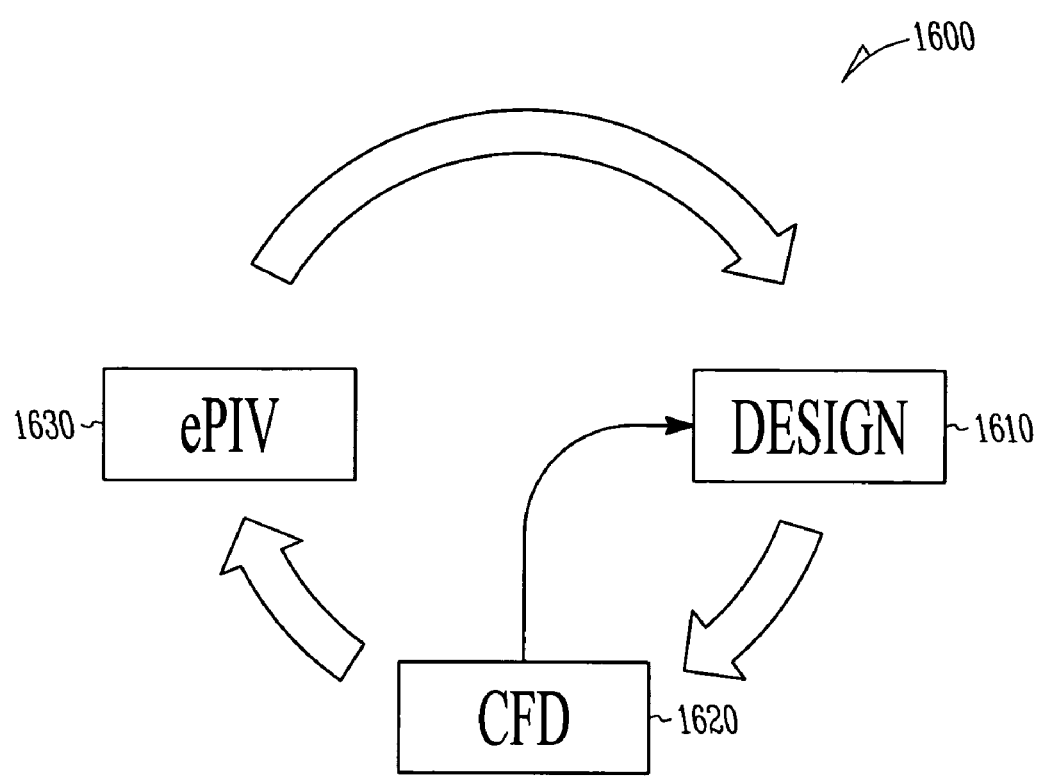
FIG. 16 is a schematic view of a computational, visualization, and analysis system according to an embodiment of the present invention.
Figure 21:
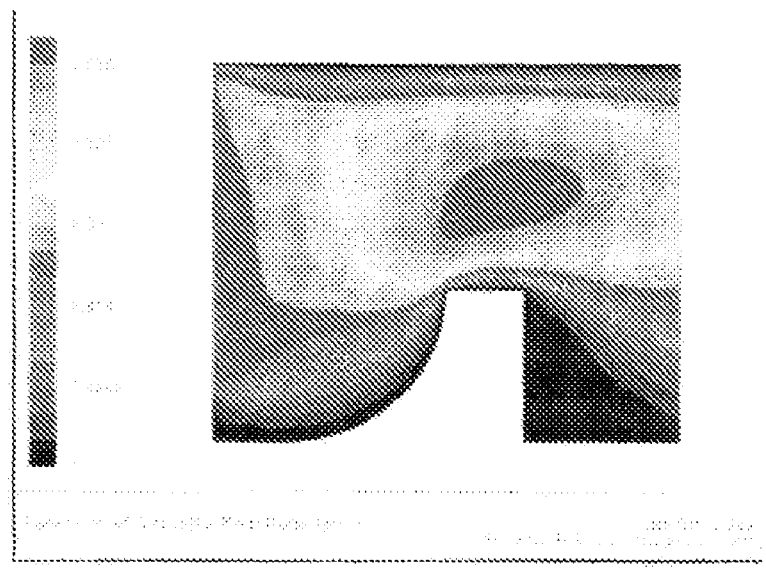
FIG. 21 is an example computational fluid dynamic, speed flow shaded plot.

FIG. 16 shows a schematic of an application 1600 of the present invention, specifically, design of a fluid flow model 1610, computational fluid dynamic analysis engine 1620, and particle image velocimetry 1630. Such an application 1600 can be used in an educational setting or in preliminary proof of concept in an industrial setting to reduce costs. Design 1610 can include initial ideas regarding a fluid flow model, such as those described herein, which can include specific examples of fluid flow obstacles shown in FIGS. 8A-8E. For these provided fluid flow models, a model file can be created and stored at a remote server, e.g., server 140 in FIG. 1. In other embodiments, a user created flow model design may be created at 1610. This user created design is then uploaded as a numerical representation to the CFD analysis engine 1620. CFD analysis engine 1620 then analyzing this data based on initial conditions and assumptions regarding the design model. In certain cases, an assumption is made that the flow is laminar and two dimensional grids are used of computation. Other assumptions and initial conditions are with the scope of the present invention. Moreover, when using the presently described fluid flow system 110, certain boundaries and flow conditions are known and can be fixed in the CFD analysis engine 1620. Examples of the boundaries include the walls of fluid flow pathway in the fluid flow model. A mesh representation of the fluid flow model is created. Various options are available here, but for purposes of education, a two-dimensional mesh is used. The finer the mesh, the more data points are produced and, hence, results in more intensive and expensive computation. It may be desirable to perform multiple iterations on a design to efficiently develop a computational model of the fluid flow model. Other data needed for CFD is the initial velocities of the fluid at various points when the fluid enters the fluid flow model. This data can be generated from data files of previous fluid flow analysis in system 110, i.e., prior PIV runs. The CFD engine 1620 produces data tables, graphs, or other representations of the fluid flow model. The fluid flow model can then be revised based on these results. The CFD engine 1620 can thus minimize the number of physical tests that needs to be performed during the validation process of a design. This reduces the cost of development as physical prototypes and tests (e.g., PIV) are more expensive then the computational effort. The CFD engine 1620 can produce graphics that illustrate the computational results that can be compared to the physical data. An example of a CFD speed flow shaded plot is shown in FIG. 21.

After computational optimization of design is achieved, then a physical test (e.g., PIV) can be performed. A user could compare the computational results to the PIV test results, e.g., the immediately above graph versus previously graphs shown herein. If the results do not agree with the CFD analysis, then the design process 1600 repeats itself until an optimized working design is achieved.

Once satisfied that fluid flow model meets a criteria, then the physical fluid flow model can be used in the presently described system 110 to generate PIV data, 1630. After the PIV data is generated, the user can compare the physical results, e.g., the PIV data, with the computational data from CFD engine 1620. A user can then investigate any differences between theoretical data (CFD) and the physical data (PIV). The process can be performed again to achieve the desired results or to compare changes to a design.

Figure 17:
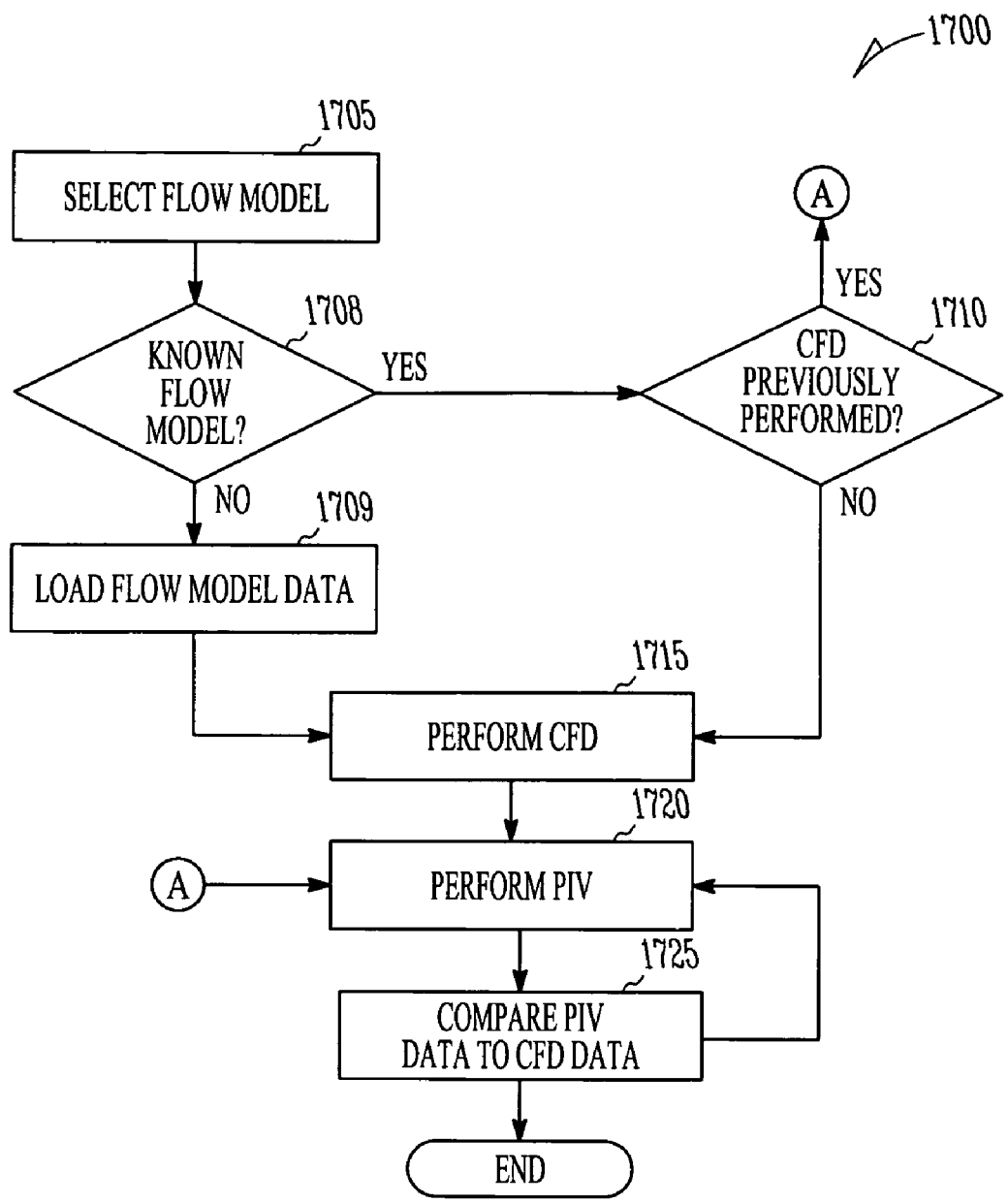
FIG. 17 is a flow chart of a method according to an embodiment.

FIG. 17 shows a flow chart of a fluid flow analysis method 1700 according to an embodiment of the present invention. At 1705, a flow model is selected. At 1708, a determination is made whether the model is an existing, known model. If so, then the method 1700 loads flow model data at 1709 and then moves to perform CFD at 1715. Loading the flow model data 1709 can include retrieving the data from the server of a support system for the present invention or the user can manually load the data. If not at 1708, then at 1710 a determination is made whether CFD was previously performed. If not, then CFD is performed at 1715. If so, then the method 1700 moves to performing PIV using the system described herein, 1720. At 1725, the physical experimental from the PIV flow model system is then compared to the computational data from the CFD step 1715. If the physical data does not match the CFD data, then the user may return to perform PIV 1720. Otherwise the method ends.

The loading of flow model data, 1709, can include the user uploading their own model if they are working with a custom one. The user can further select various options pertaining grid generation, which is used in CFD. For existing models, a number of grids may already be generated. Otherwise, the user enters boundary conditions manually. In an alternate embodiment, the boundary conditions are determined from previous PIV data.

Performing CFD, 1715, can include producing graphs and images (e.g. velocity vector field, velocity magnitude graphs) that are equivalent to graphs and images that are produced by PIV using the present system.

Comparing PIV results with the corresponding CFD results, 1725, can include comparing the raw data, graphs, images, or combinations thereof. The user should be able to explain how well they match, or if they do not match, try to explain why it did not match. Based on this comparison, the user should be able to go back and reiterate to more closely match the data or see how changes to the PIV test equipment or data input into the CFD step may change results.

The present system(s) and method(s) should assist a user in analysis of experiments, including but not limited to, quantitatively generate a velocity vector field, plot data in graphical format with label and units of variables, e.g. shaded plot, extract data from the results and plot in linear graphical form, e.g. velocity versus location, calculate the average flow rate at a particular cross section, understand variability in experimental results, export velocity data into Excel or another analysis software to perform further calculations, e.g. calculate vorticity.

The present system(s) and method(s) should assist a user in understanding fluids concepts, such as laminar flow, turbulent flow, Reynolds number, boundary layer, shear layer, strain rates, shear rate, streamlines, vorticity, viscosity, flow separation, continuity, recirculation, flow acceleration and deceleration. When multiple flow models are supplied with the fluid flow device, the user will also be assisted in understanding the various flow phenomena observed in the flow models supplied with the system, how to design custom flow models to create custom case studies, how to follow the design optimization process (FIG. 16), research skills including using a professional laboratory notebook, the importance of keeping accurate records, reading the manual and following operating instructions, changing the seeding density incrementally and observing the PIV results, following the sequential process of removing bubbles—if any—as per the instruction manual, recording PIV data for further analysis and report writing, ability to vary the flow rate and direction, ability to interchange the flow models, and a use of present software and hardware, and optimizing PIV parameters.

The above Detailed Description is intended to be illustrative, and not restrictive. Accordingly, the various embodiments described herein may be implemented with software, firmware, or hardware. The various embodiments are not necessarily mutually exclusive, as some embodiments can be combined with one or more other embodiments to form new embodiments. For example, the above-described embodiments (and/or aspects thereof) embodiments may be combined, utilized and derived therefrom, such that structural and logical substitutions and changes may be made without departing from the scope of this disclosure. Such embodiments of the inventive subject matter may be referred to herein, individually and/or collectively, by the term "invention" merely for convenience and without intending to voluntarily limit the scope of this application to any single invention or inventive concept if more than one is in fact disclosed. Many other embodiments will be apparent to those of skill in the art upon reviewing the above description. The scope of the invention should, therefore, be determined with reference to the appended claims, along with the full scope of equivalents to which such claims are entitled.

Other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A fluid flow analysis system, comprising:
a computational unit to perform computational fluid dynamics;
a particle image velocimetry device to generate physical test data at a removable obstacle, wherein the removable obstacle is positioned in an imaging portion of a fluid flow path; and
a control unit in communication with the computational unit to receive computational fluid dynamics data and in communication with the particle image velocity device to receive the physical test data.

2. The system of claim 1, wherein the computational unit receives boundary conditions related to a fluid flow path in the particle image velocimetry device.

3. The system of claim 2, wherein the computational unit downloads boundary conditions from a server.

4. The system of claim 2, wherein the computational unit downloads boundary conditions from a user.

5. The system of claim 2, wherein the computational unit downloads boundary conditions that relate to walls of the fluid flow path.

6. The system of claim 1, wherein the computational unit generates mesh data for a given flow model to be modeled in the particle image velocimetry device.

7. The system of claim 1, wherein the computational unit computes initial flow conditions based on prior data from the particle image velocimetry device.

8. The system of claim 1, wherein the computational unit is part of the control unit.

9. The system of claim 1, wherein the fluid flow path travels adjacent a light source, which illuminates particles in the fluid, to cool the light source, wherein the control unit controls a pump, wherein the obstacle is removable from the imaging portion of a fluid flow path such that a further obstacle may be positioned in the imaging portion of a fluid flow path such that a different obstacle may be studied in the particle image velocimetry device.

10. A fluid flow analysis system, comprising:
a computational unit to perform computational fluid dynamics;
a particle image velocimetry device to generate physical test data; and
a control unit in communication with the computational unit to receive computational fluid dynamics data and in communication with the particle image velocity device to receive the physical test data;
wherein the particle image velocimetry device includes:
a housing;
a fluid flow path operably connected to the housing;
a pump connected to the housing and to move fluid in the fluid flow path;
a removable obstacle assembly that includes a portion of the fluid flow path and a removable obstacle positioned in the portion of the fluid flow path;
a light source to illuminate fluid adjacent the obstacle in the fluid flow path;
an imager to image fluid adjacent the obstacle in the fluid flow path; and
a further control unit in communication with the imager.

11. The system of claim 10, wherein the further control unit is to receive commands including at least one of the group consisting of brightness, exposure, frame rate, gain, and video size, wherein the imager is a digital, charge coupled device, wherein the housing includes a blood flow simulation device operably connected to the fluid flow path, and wherein the housing includes a pressure measurement device to measure fluid pressure in the fluid flow path.

12. The system of claim 10, wherein the fluid flow path travels adjacent the light source to cool the light source.

13. The system of claim 12, wherein the pump runs continuously while the system is on and provides fluid flow to cool the light source.

14. The system of claim 10, wherein the obstacle is removable from the body such that a further obstacle may be positioned in the body such that a different obstacle may be studied in the particle image velocimetry device.

15. The system of claim 10, wherein the light source includes a laser that emits a low power, green light.

16. The system of claim 10, wherein the housing includes a slot to receive the obstacle assembly, wherein the slot includes an open end that is not aligned with the light source such that no direct light escapes the housing with the obstacle assembly removed, and wherein the light source includes a switch that turns off the light source with the obstacle assembly removed and that turns on the light source with the obstacle assembly in the slot.

17. A fluid flow analysis method, comprising:
providing computational fluid flow dynamics data of a fluid flow model including generating physical test data at a removable obstacle wherein the removable obstacle is positioned in an imaging portion of a fluid flow path;
performing particle image velocimetry on the fluid flow model; and
comparing particle image velocimetry data to the computational fluid flow dynamics data.

18. The method of claim 17, wherein providing computational fluid flow dynamics data includes a user uploading at least one of boundary conditions or initial conditions for performing computational fluid flow dynamics analysis.

19. The method of claim 17, wherein providing computational fluid flow dynamics data includes downloading stored boundary conditions and initial conditions for computational fluid flow dynamics analysis.

20. The method of claim 17 wherein providing computational fluid flow dynamics data includes moving fluid in the fluid flow path adjacent a removable obstacle assembly that includes a portion of the fluid flow path and an obstacle positioned in the portion of the fluid flow path, illuminating fluid adjacent the obstacle in the fluid flow path, and imaging fluid adjacent the obstacle in the fluid flow path.

* * * * *